(12) United States Patent
Yasuda et al.

(10) Patent No.: US 10,379,610 B2
(45) Date of Patent: Aug. 13, 2019

(54) INFORMATION PROCESSING DEVICE AND INFORMATION PROCESSING METHOD

(71) Applicant: SONY CORPORATION, Tokyo (JP)

(72) Inventors: Ryouhei Yasuda, Kanagawa (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/915,634

(22) PCT Filed: Jun. 18, 2014

(86) PCT No.: PCT/JP2014/066201
§ 371 (c)(1),
(2) Date: Feb. 29, 2016

(87) PCT Pub. No.: WO2015/029554
PCT Pub. Date: Mar. 5, 2015

(65) Prior Publication Data
US 2016/0231809 A1 Aug. 11, 2016

(30) Foreign Application Priority Data

Sep. 2, 2013 (JP) ................................ 2013-181227

(51) Int. Cl.
*G06F 3/01* (2006.01)
*G09G 5/00* (2006.01)
(Continued)

(52) U.S. Cl.
CPC .............. *G06F 3/013* (2013.01); *G06F 3/017* (2013.01); *G06F 3/0482* (2013.01); *G06K 9/00248* (2013.01); *G09G 5/00* (2013.01); *G09G 5/26* (2013.01); *H04N 5/44504* (2013.01); *H04N 5/44543* (2013.01); *G09G 2340/045* (2013.01);
(Continued)

(58) Field of Classification Search
None
See application file for complete search history.

(56) References Cited

U.S. PATENT DOCUMENTS 6,191,892 B1 * 2/2001 Isaka .................... G02B 27/017
359/630
6,392,657 B1 * 5/2002 Hilliard ............... G06F 3/04897
345/589
(Continued)

FOREIGN PATENT DOCUMENTS

JP 2000-138872 A 5/2000
JP 2002-062863 A 2/2002
(Continued)

*Primary Examiner* — Samira Monshi
(74) *Attorney, Agent, or Firm* — Chip Law Group

(57) ABSTRACT

An information processing device of the present invention includes a sightline distance calculating unit (106) configured to calculate a sightline distance between a position of a user and a position of a point specified on an image display surface based on a sightline direction of the user, a character size calculating unit (108) configured to determine a character size in accordance with the sightline distance calculated by the sightline distance calculating unit (106), and a display control unit (110) configured to determine a size of a display image in accordance with the character size calculated by the character size calculating unit (108).

18 Claims, 17 Drawing Sheets

(51) Int. Cl.
*G09G 5/26* (2006.01)
*G06K 9/00* (2006.01)
*H04N 5/445* (2011.01)
*G06F 3/0482* (2013.01)

(52) U.S. Cl.
CPC . *G09G 2340/0407* (2013.01); *G09G 2340/14* (2013.01); *G09G 2354/00* (2013.01)

(56) References Cited

U.S. PATENT DOCUMENTS

| | | | | |
|---|---|---|---|---|
| 2007/0035771 | A1* | 2/2007 | Kitamaru | H04N 1/00238 358/1.18 |
| 2008/0074444 | A1* | 3/2008 | Morikawa | G09G 5/005 345/660 |
| 2009/0174658 | A1* | 7/2009 | Blatchley | G06F 1/1601 345/158 |
| 2009/0239591 | A1* | 9/2009 | Alameh | H04M 1/05 455/574 |
| 2012/0301030 | A1* | 11/2012 | Seto | H04N 21/41407 382/190 |
| 2013/0304479 | A1* | 11/2013 | Teller | G06F 3/013 704/275 |
| 2014/0247208 | A1* | 9/2014 | Henderek | G06F 3/0481 345/156 |
| 2014/0347262 | A1* | 11/2014 | Paek | G09G 3/20 345/156 |

FOREIGN PATENT DOCUMENTS

| | | |
|---|---|---|
| JP | 2008-096776 A | 4/2008 |
| JP | 2009-031368 A | 2/2009 |
| JP | 2011-510364 A | 3/2011 |
| JP | 2013-120347 A | 6/2013 |
| WO | 2009-125481 | 10/2009 |
| WO | 2010-089989 | 8/2010 |
| WO | 2011-158511 | 12/2011 |
| WO | 2014-084193 | 6/2014 |

* cited by examiner

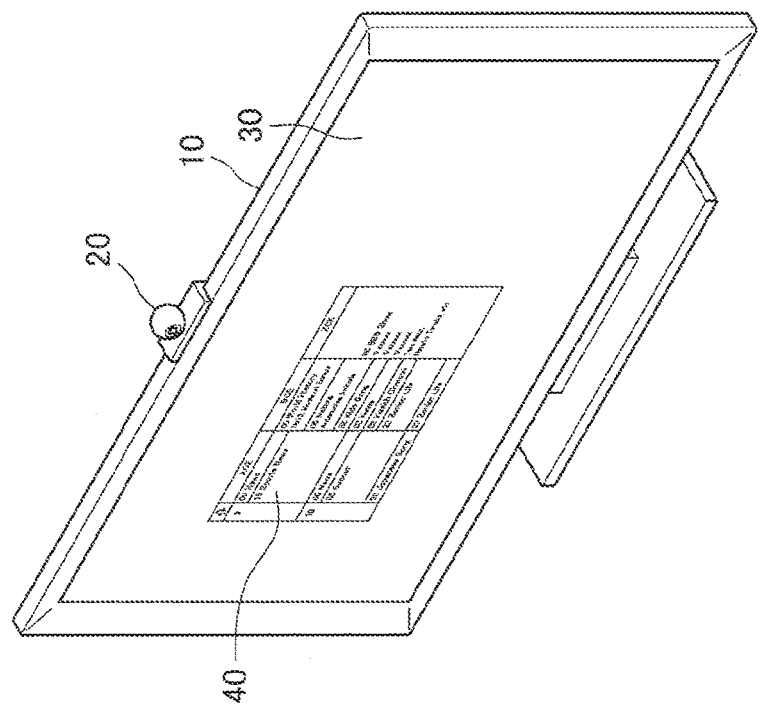
FIG. 1
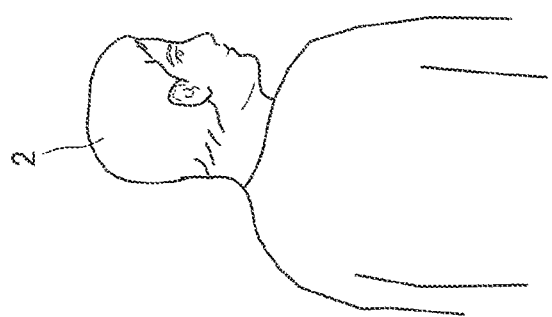

FIG. 7
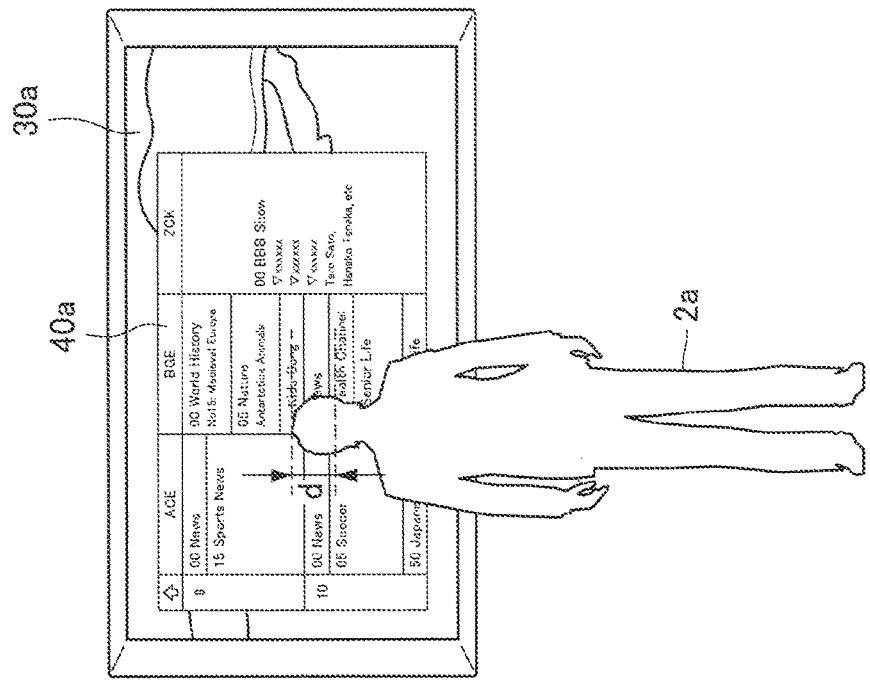
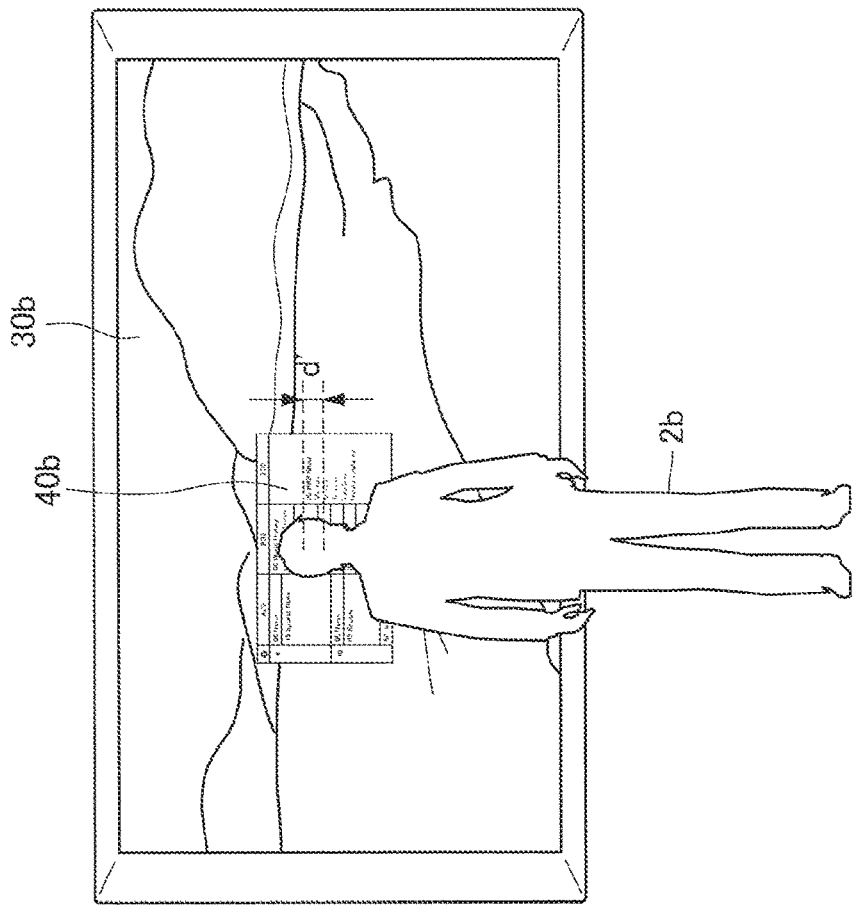

FIG. 15
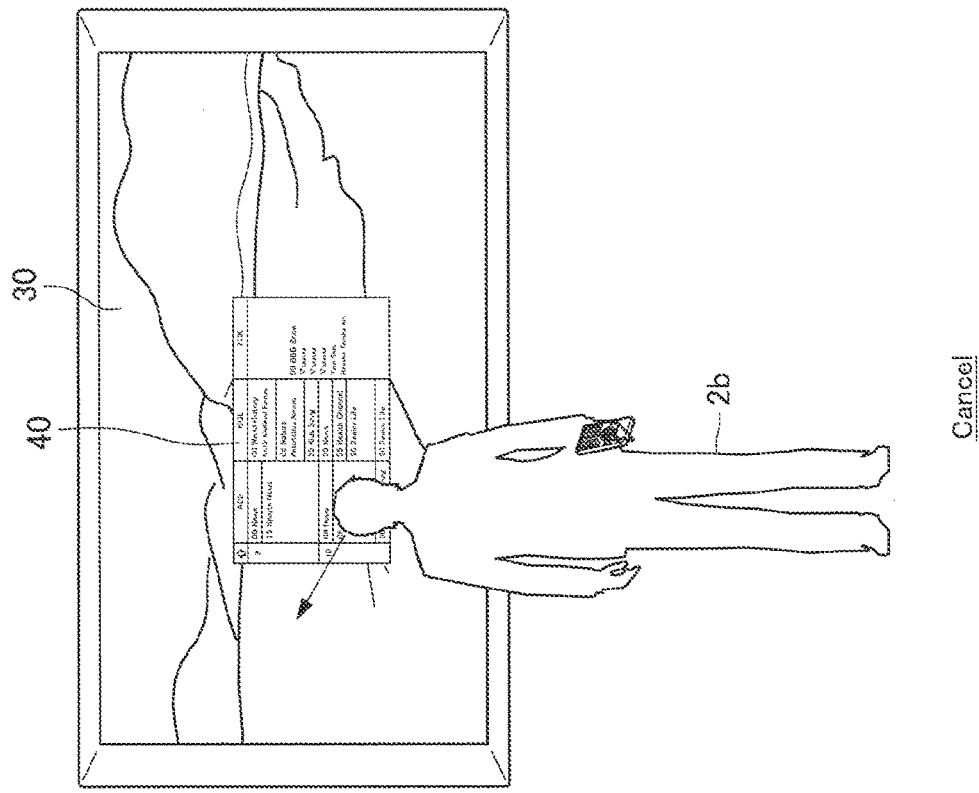
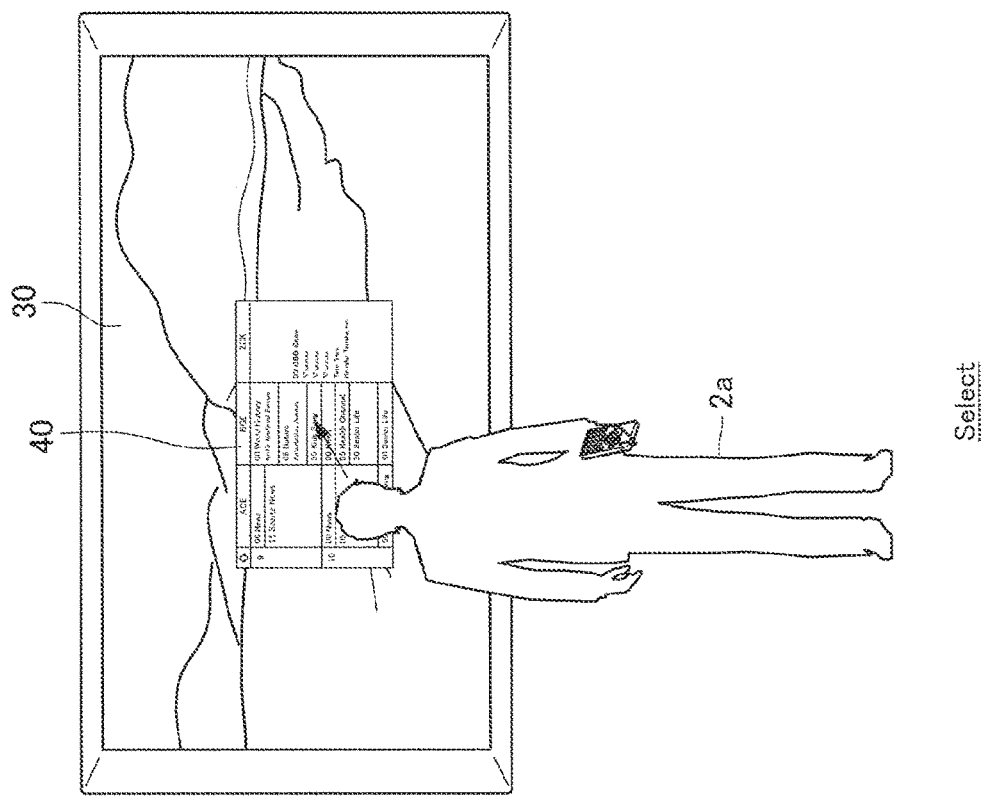

INFORMATION PROCESSING DEVICE AND INFORMATION PROCESSING METHOD

TECHNICAL FIELD

The present disclosure relates to an information processing device, an information processing method, and a program.

BACKGROUND ART

In recent years, a television receiver having a display with a size of 50 inches or more, such as a liquid crystal display or a plasma display, has been developed. In such a television receiver, a user can view on a big screen a picture such as a movie or a television program, for example.

In addition, a display device, such as a projector, in which the user can adjust a size of an image displayed on a display surface has prevailed widely. For example, in Patent Literature 1, disclosed is a technology to increase a size of a small screen displayed on a display device as a user goes away from the display device. In addition, in Patent Literature 2, disclosed is a technology to change a size with which a character or a figure is displayed in accordance with a distance between a grip module which a user has in the hand and a light-emitting module fixed to a television apparatus.

CITATION LIST

Patent Literature

Patent Literature 1 WO 2009/125481
Patent Literature 2 JP 2008-096776A

SUMMARY OF INVENTION

Technical Problem

However, with the above-mentioned technologies, it is difficult to sufficiently secure visibility of an image displayed on the display surface. For example, with the above-mentioned technologies, when a user is located in the same place, a size of an image does not change even when the user changes temporarily a direction of a face, or a direction of a sightline. Therefore, when the user views the display surface from an oblique direction, the image looks small to the user, and will be hard to be seen.

Then, the present disclosure proposes an information processing device, an information processing method, and a program which are new and improved and capable of securing the visibility of the image displayed on the display surface.

Solution to Problem

To solve the problem, according to an aspect of the present disclosure, there is provided an information processing device including: a sightline distance calculating unit configured to calculate a sightline distance between a position of a user and a position of a point specified on an image display surface based on a sightline direction of the user; and a display control unit configured to determine a size of a display image displayed on the image display surface in accordance with the sightline distance calculated by the sightline distance calculating unit.

To solve the problem, according to another aspect of the present disclosure, there is provided an information processing method including: calculating a sightline distance between a position of a user and a position of a point specified on an image display surface based on a sightline direction of the user; and determining, by a processor, a size of a display image displayed on the image display surface in accordance with the calculated sightline distance.

To solve the problem, according to another aspect of the present disclosure, there is provided a program for causing a computer to function as: a sightline distance calculating unit configured to calculate a sightline distance between a position of a user and a position of a point specified on an image display surface based on a sightline direction of the user; and a display control unit configured to determine a size of a display image displayed on the image display surface in accordance with the sightline distance calculated by the sightline distance calculating unit.

Advantageous Effects of Invention

According to the present disclosure as described above, the visibility of the image displayed on the display surface can be secured. Note that, an effect described here is not necessarily limited, and may be any of effects described in the present disclosure.

BRIEF DESCRIPTION OF DRAWINGS

FIG. 1 is an explanatory view illustrating a configuration example of an information processing system according to an embodiment of the present disclosure.

FIG. 7 is an explanatory view illustrating a display example of a menu image 40 according to the embodiment.

FIG. 15 is an explanatory view illustrating an operation example of the user 2 with respect to the menu image 40.

DESCRIPTION OF EMBODIMENTS

Figure 2:
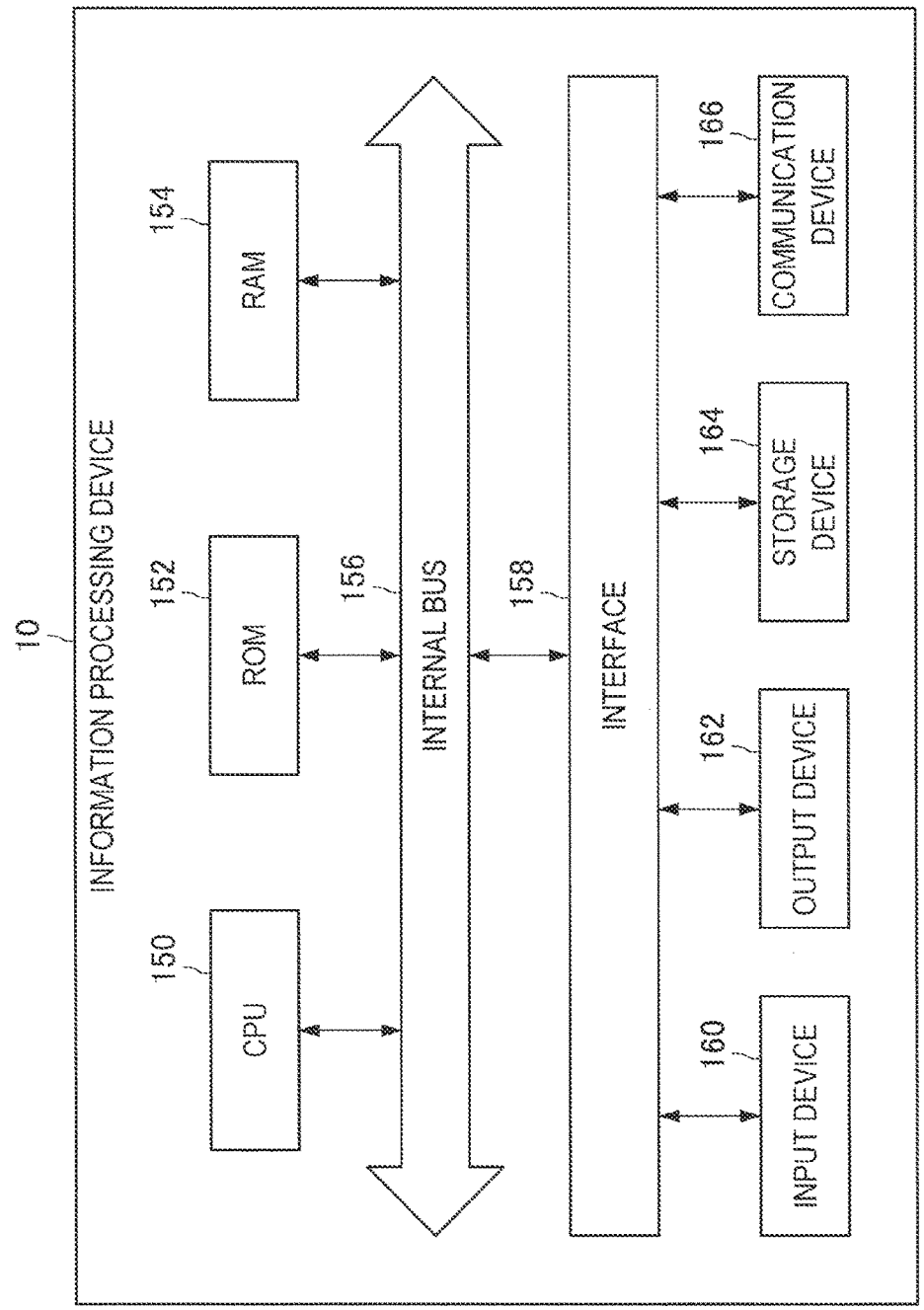
FIG. 2 is an explanatory view illustrating a hardware configuration of an information processing device 10 according to the embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In addition, in the present specification and drawings, two or more elements that have substantially the same function and structure may be discriminated with different alphabets denoted after the same reference signs. For example, two or more structures that have substantially the same function and structure are discriminated as a display surface 30a and a display surface 30b as necessary. However, each of two or more elements that have substantially the same function and structure, when it is not necessary to be discriminated in particular, is denoted with only the same reference sign. For example, a display surface 30a and a display surface 30b, when they are not necessary to be discriminated in particular, are referred to merely as a display surface 30.

In addition, the "Embodiments" will be described in accordance with an order of items indicated in the following.
1. Basic configuration of information processing system
2. Detailed description of embodiments
   2-1. Configuration
   2-2. Operation
   2-3. Effect
3. Modification example

1. Basic Configuration of Information Processing System

The present disclosure, as is described in detail as an example in "2. Detailed description of embodiments", may be implemented in various forms. Hereinafter, first, a basic configuration of the information processing system according to the present disclosure will be described.

FIG. 1 is an explanatory view illustrating the basic configuration of the information processing system according to the present embodiment. As illustrated in FIG. 1, the information processing system according to the present embodiment includes an information processing device 10 and a camera 20.

1-1. Information Processing Device 10

The information processing device 10 is a device for making an image such as a menu image 40 be displayed on the display surface 30. This information processing device 10 may be a display device such as a television receiver and a display device, for example.

Here, the display surface 30 is an example of an image display surface in the present disclosure, and is a large-sized screen, for example. This display surface 30 is displayed by an output device 162 described later, for example. In addition, the menu image 40 is an example of a display image in the present disclosure. An example of the menu image 40 includes a program table of television programs, a web page, an image reproduced from a digital versatile disc (DVD), or a display image of game software.

The information processing device 10 can make the menu image 40 be displayed on the display surface 30 in accordance with an operation by a user 2 who views the display surface 30, for example. For example, when an operation for making the menu image 40 be displayed, such as a depression of a "menu button" in a remote controller (illustration omitted) is performed by the user 2, the information processing device 10 makes the menu image 40 be displayed on the display surface 30. In addition, when an operation for deleting the menu image 40, such as a depression of a "return button" in the remote controller is performed by the user 2, the information processing device 10 deletes the menu image 40 from the display surface 30.

In addition, the information processing device 10 can make a background image in addition to the menu image 40 be displayed on the display surface 30. The information processing device 10 can perform any of making the menu image 40 and the background image be displayed together on the display surface 30, making only the menu image 40 be displayed, or making only the background image be displayed. Note that, when the menu image 40 and the background image are displayed together on the display surface 30, the information processing device 10 makes the menu image 40 be displayed in front of the background image, i.e., be displayed in a superimposed manner.

Note that, as for the background image, only one type may be displayed on the display surface 30, and two or more types may be displayed. In addition, as examples of the background image, various kinds of images such as a picture of a television program, a moving image and a still image which are reproduced from a storage device 164 described later, a moving image and a still image which are read out by the information processing device 10 from a recording medium such as a DVD or a universal serial bus (USB) memory, or a desktop screen of an operating system (OS) are included, for example. In addition, the background image may be a unicolor screen of a black color or a white color, for example, which does not include a character or an image.

In addition, the information processing device 10 has a hardware configuration as illustrated in FIG. 2, for example. As illustrated in FIG. 2, the information processing device 10 includes a central processing unit (CPU) 150, a read only memory (ROM) 152, a random access memory (RAM) 154, an internal bus 156, an interface 158, an input device 160, an output device 162, a storage device 164, and a communication device 166.

(CPU 150)

The CPU 150 includes, for example, various processing circuits, and functions as a control unit 100 which controls the whole information processing device 10. In addition, the CPU 150, in the information processing device 10, for example, realizes functions of a sightline specifying unit 102, a viewing position calculating unit 104, a sightline distance calculating unit 106, a character size calculating unit 108, a display control unit 110, and an input judgment unit 112, which are described later.

(ROM 152)

The ROM 152 stores control data etc. such as a program and computation parameters which the CPU 150 uses.

(RAM 154)

The RAM 154, for example, stores temporarily a program, etc. executed by the CPU 150.

(Interface 158)

The interface 158 connects the input device 160, the output device 162, the storage device 164, and the communication device 166 with the internal bus 156. For example, the input device 160 exchanges data with the CPU 150 or others via the interface 158 and the internal bus 156.

(Input Device 160)

The input device 160 includes, for example, an input section for a user to input information, such as a touch panel, a button, a microphone and a switch, and an input control circuit that generates an input signal based on an input by a user, and outputs the input signal to the CPU 150, etc. The input device 160 functions as an input unit 122 described later, for example.

(Output Device 162)

The output device 162 includes a display device such as a liquid crystal display (LCD) device, an organic light emitting diode (OLED) device, and a lamp, for example. In addition, the output device 162 includes an audio output device such as a loudspeaker. For example, the display device displays a photographed image and a generated image, etc. In addition, the audio output device converts voice data, etc. into a voice, and outputs the voice. This output device 162 functions as a display unit 124 described later, for example.

(Storage Device 164)

The storage device 164 is a device for data storage, for example, that stores a program executed by the CPU 150 and various data. The storage device 164 includes a storage medium, a recording device that records data on the storage medium, a read-out device that reads out data from the storage medium, or a deletion device that deletes data recorded on the storage medium, etc., for example.

(Communication Device 166)

The communication device 166 is a communication interface including a communication device, etc. for connecting with a communication network such as a public network and the Internet, for example. In addition, the communication device 166 may be a wireless LAN compatible communication device, a long term evolution (LTE) compatible communication device, or a wire communication device that performs communication by a wire. The communication device 166 functions as a communication unit 120 described later, for example.

Note that, the hardware configuration of the information processing device 10 is not limited to the above-mentioned configuration. For example, the information processing device 10 may not include one or more of the input device 160, the output device 162, the storage device 164, and the communication device 166.

1-2. Camera 20

The camera 20 has a function to form an image of the outside picture through a lens on an image pickup element such as a charge coupled device (CCD) and a complementary metal oxide semiconductor (CMOS), for example, and to photograph a still image or a moving image. For example, the camera 20 photographs an image of the user 2 or an object located in front of the lens.

In addition, the camera 20 can transmit the photographed image to the information processing device 10 by wired communication or wireless communication.

Note that, the information processing system according to the present embodiment is not limited to the above-mentioned configuration. For example, the information processing device 10 and the camera 20 may be constituted integrally in such a way that the information processing device 10 includes the camera 20 inside.

1-3. Arrangement of Problems

Incidentally, supposing that a display size of the menu image 40 displayed on the display surface 30 does not change, visibility of the menu image 40 changes according to a position of the user 2 and a sightline direction of the user 2, for example. For example, the larger a distance between the user 2 and the display surface 30 is, the smaller the menu image 40 looks to the user 2, and it will become hard to be seen. In addition, the menu image 40 looks smaller in a case where the user 2 views the display surface 30 from an oblique direction than in a case where the user 2 views the display surface 30 from the front, and therefore, is hard to be seen. Especially, in a case where a character is included in the menu image 40, readability of the character deteriorates remarkably.

Then, with the above-mentioned situation as a viewpoint, the information processing device 10 according to an embodiment of the present disclosure has been created. The information processing device 10 according to an embodiment of the present disclosure can secure the visibility of the menu image 40 displayed on the display surface 30. Hereinafter, such an embodiment of the present disclosure will be described in detail.

2. Detailed Description of Embodiments 2-1. Configuration

Figure 3:
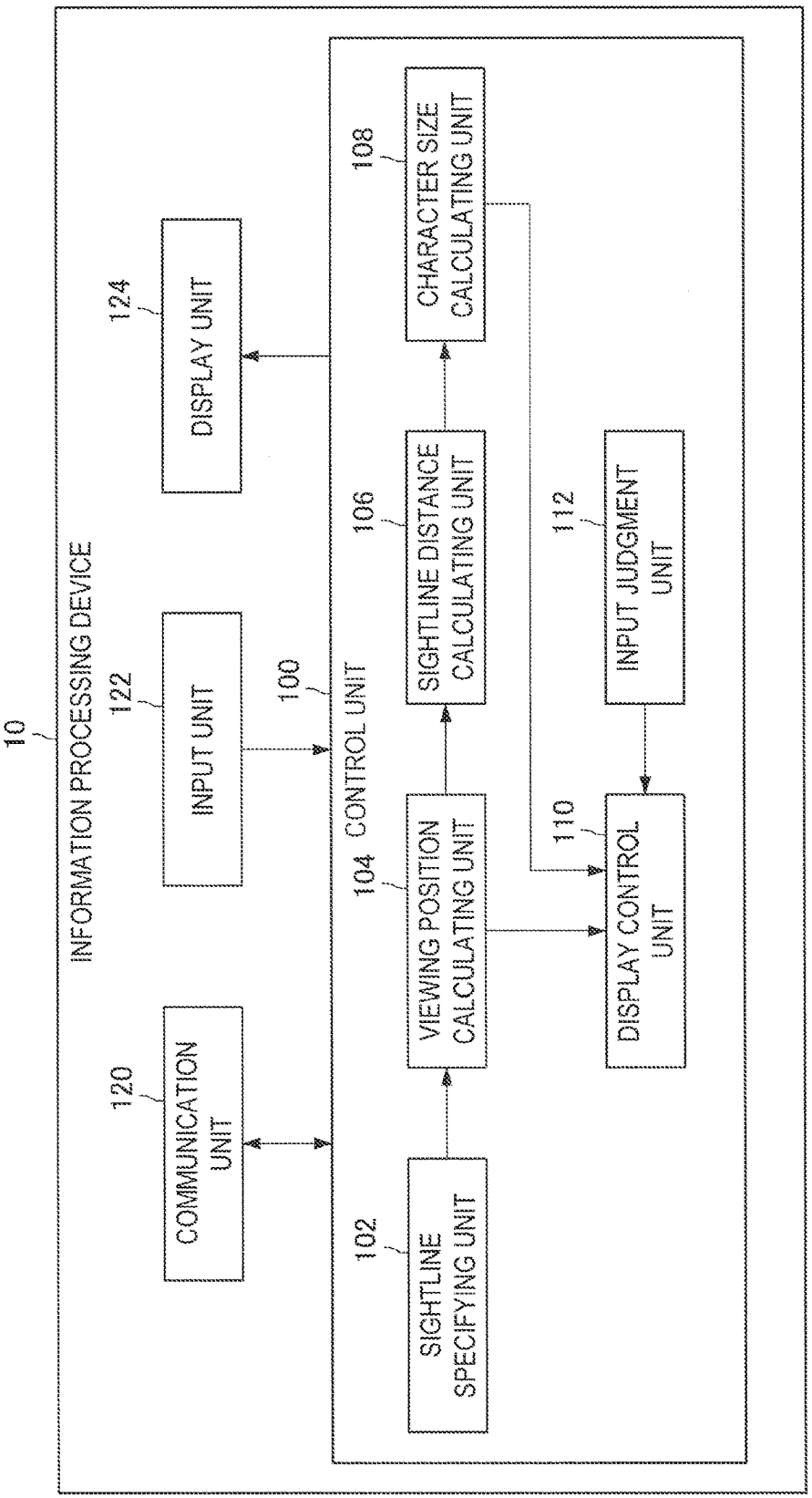
FIG. 3 is a functional block diagram illustrating a configuration of the information processing device 10 according to the embodiment.

FIG. 3 is a functional block diagram illustrating a configuration of the information processing device 10 according to the present embodiment. As illustrated in FIG. 3, the information processing device 10 has the control unit 100, the communication unit 120, the input unit 122, and the display unit 124.

2-1-1. Control Unit 100

The control unit 100, using hardware such as the CPU 150 and the RAM 154 which are built-in in the information processing device 10, controls overall operation of the information processing device 10. In addition, as illustrated in FIG. 3, the control unit 100 has the sightline specifying unit 102, the viewing position calculating unit 104, the sightline distance calculating unit 106, the character size calculating unit 108, the display control unit 110, and the input judgment unit 112.

2-1-2. Sightline Specifying Unit 102

(A. Specifying of Position of User 2)

The sightline specifying unit 102 specifies a position of the user 2 based on an image photographed by the camera 20. More specifically, the sightline specifying unit 102 specifies an eye position of the user 2 based on the image photographed by the camera 20. For example, the sightline specifying unit 102 detects a face of the user 2 by extracting a feature point such as eyes, a nose, or a face contour, for example, from the image photographed by the camera 20. Then, the sightline specifying unit 102 calculates a relative position of the user 2 from the camera 20 based on a distance between the eyes of the user 2 or the face size of the user 2, etc. which have been detected, for example.

(B. Specifying of Sightline Direction of User 2)

In addition, the sightline specifying unit 102 specifies the sightline direction of the user 2 based on the image photographed by the camera 20. For example, the sightline specifying unit 102 detects the eyes of the user 2 based on the face image of the user 2 detected from the image photographed by the camera 20. Then, the sightline specifying unit 102 specifies the sightline direction of the user 2 by performing pattern matching to the image of the detected eyes of the user 2.

Figure 4:
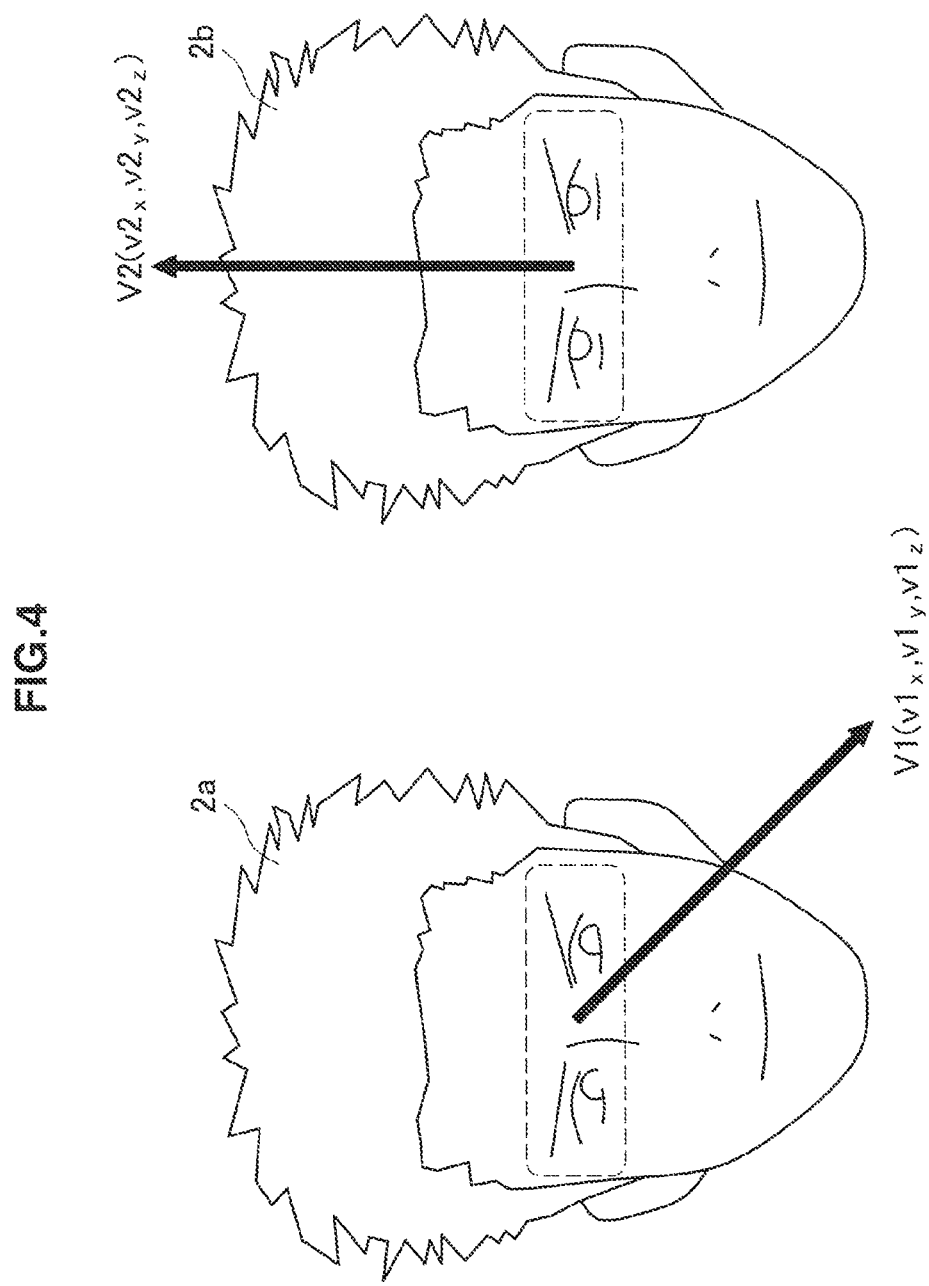
FIG. 4 is an explanatory view illustrating a specifying method of a sightline direction according to the embodiment.

Here, with reference to FIG. 4, the above-mentioned function will be described in more detail. As illustrated in FIG. 4, the sightline specifying unit 102 specifies V1 (v1x, v1y, v1z) as a sightline direction of a user 2a based on an image of the eyes of the user 2a, for example. In addition, the sightline specifying unit 102 specifies V2 (v2x, v2y, v2z) as a sightline direction of a user 2b based on an image of the eyes of the user 2b.

Note that, as a specific example of the specifying method, the following is given, for example. First, by a certain image processing device, machine learning is performed using photographed images of entire eyes of two or more persons, which are associated with sightline directions, and thereby, dictionary data for pattern matching are created. Then, the sightline specifying unit 102 compares a feature amount relevant to the eyes of the user 2, which is detected from images photographed by the camera 20, with the above-mentioned dictionary data, and thereby, specifies which direction is the sightline direction of the user 2. Note that, the above-mentioned image processing device may be the information processing device 10 or may be a different device.

Modification Example

Note that, when the user 2 is located in an oblique direction against the display surface 30, an image of the face directed in the oblique direction is photographed by the camera 20, and therefore, there is a situation that it is difficult to perform pattern matching using the detected image itself of the eyes of the user 2. Therefore, as a modification example, it is possible for the sightline specifying unit 102 to perform image correction such as converting in advance a face image of the user 2 into an image directed to the front before performing pattern matching, for example.

2-1-3. Viewing Position Calculating Unit 104

The viewing position calculating unit 104 calculates a viewing position of the user 2 on the display surface 30, based on the eye position of the user 2 and the sightline direction of the user 2 which are specified by the sightline specifying unit 102. Here, the viewing position, like a position of a coordinate (a, b) point illustrated in FIG. 5, is a position which the user 2 views on the display surface 30 or a region near the position which the user 2 views, for example.

Figure 5:
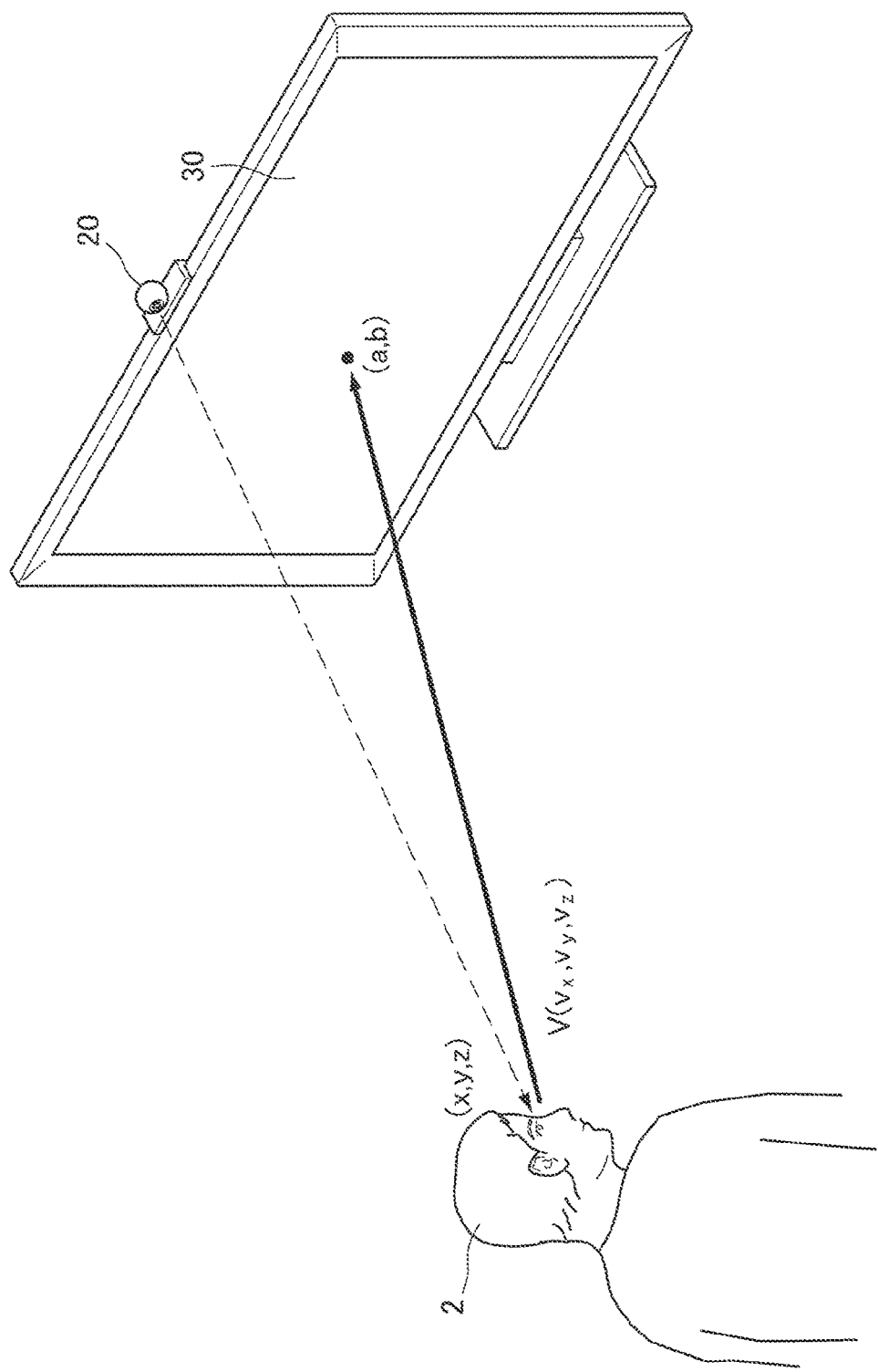
FIG. 5 is an explanatory view illustrating a calculating method of a viewing position according to the embodiment.

For example, as illustrated in FIG. 5, the viewing position calculating unit 104 calculates, as the viewing position, a position of an intersection point (hereinafter, also referred to as a sightline intersection point) between a half-line extended from the eye position (x, y, z) of the user 2 to a sightline direction V (vx, vy, vz) of the user 2 and the display surface 30.

Modification Example

Note that, generally, since a shape of a human being's eye is a horizontally long elliptical shape, with respect to the sightline direction specified by the sightline specifying unit 102, there is a tendency that an accuracy of a component in a vertical direction becomes lower than an accuracy of a component in a horizontal direction. Therefore, as a modification example, the viewing position calculating unit 104 may calculate a coordinate value of the viewing position in the vertical direction based on the coordinate value in the vertical direction at the above-mentioned sightline intersection point and a height of the head (or eyes) of the user 2. For example, the viewing position calculating unit 104, with respect to a coordinate value of the viewing position in a vertical direction, calculates a weighted average value using a prescribed coefficient such as 0.5, for example, between the coordinate value in the vertical direction in the above-mentioned sightline intersection point and the coordinate value in the vertical direction of the head (or eyes) of the user 2.

2-1-4. Sightline Distance Calculating Unit 106

The sightline distance calculating unit 106, based on the eye position of the user 2 and the sightline direction of the user 2 which are specified by the sightline specifying unit 102, calculates a sightline distance between the eye position of the user 2 and a position of a point specified (hereinafter, also referred to as a specific point) on the display surface 30. Here, the specific point is the viewing position calculated by the viewing position calculating unit 104, for example. Alternatively, the specific point may be a point that has a coordinate value which is the same as the viewing position with respect to a horizontal direction, and with respect to a vertical direction, has a coordinate value which is the same as or near to a position of a height of the user's eyes which is specified by the sightline specifying unit 102. Alternatively, the specific point may be a point that has a prescribed coordinate value determined in advance with respect to one of a horizontal direction and a vertical direction, and has the same coordinate value as the viewing position with respect to the other.

2-1-5. Character Size Calculating Unit 108

The character size calculating unit 108 calculates a size of the character included in the menu image 40 in accordance with the sightline distance calculated by the sightline distance calculating unit 106. More specifically, the larger the sightline distance is, the larger the character size calculating unit 108 calculates a size of the character included in the menu image 40.

Figure 6:
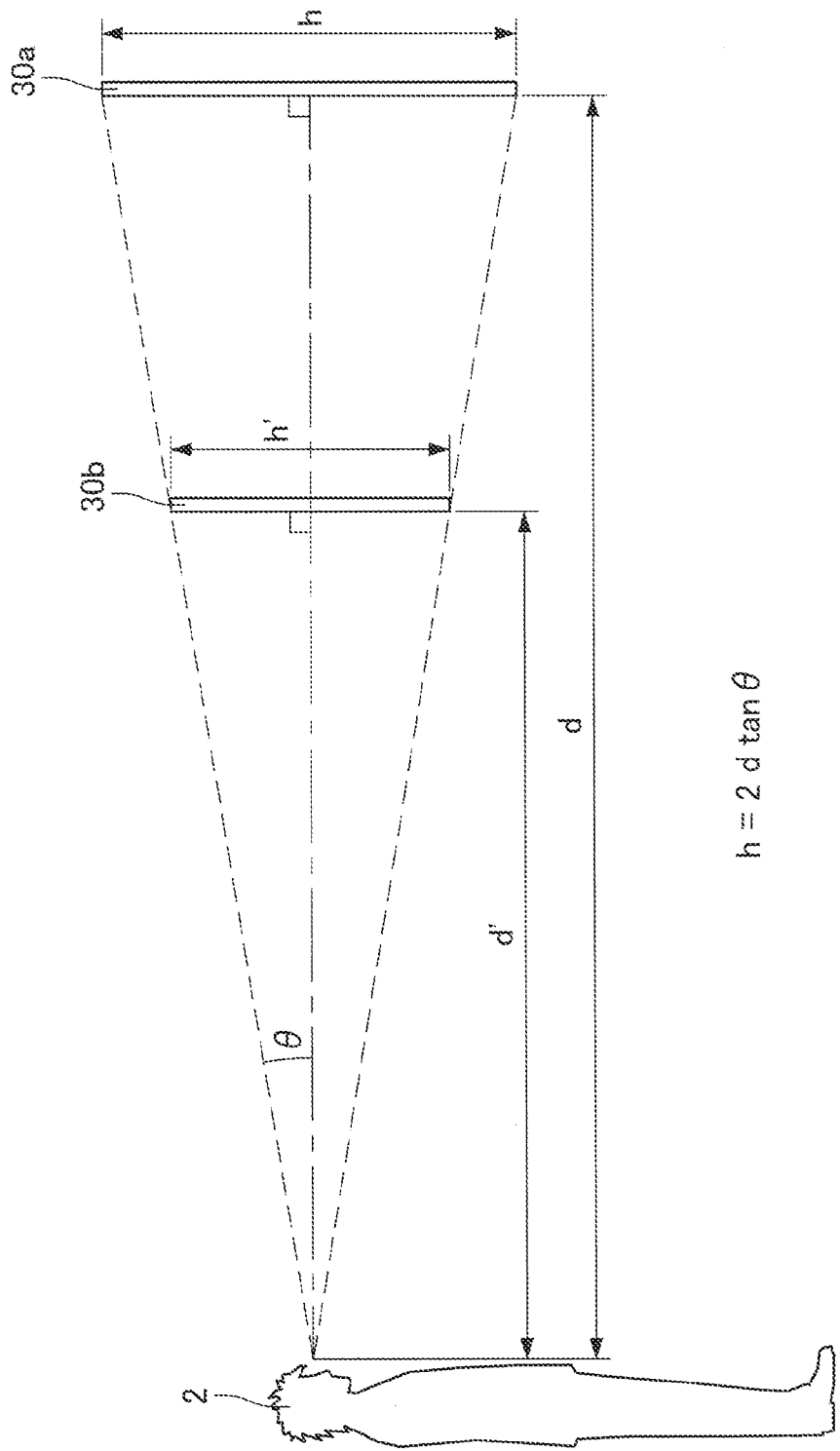
FIG. 6 is an explanatory view illustrating a calculating method of a font size according to the embodiment.

Here, with reference to FIG. 6, the above-mentioned function will be described in more detail. FIG. 6 illustrates an explanatory view for explaining a character size calculating method by the character size calculating unit 108. Note that θ illustrated in FIG. 6 is a viewing angle of the user 2 in a vertical direction.

As illustrated in FIG. 6, the character size calculating unit 108 calculates a character height h using a vertical viewing angle θ and a sightline distance d by the following Formula (1), for example.

[Math. 1]

$$h = 2d \tan \theta \qquad (1)$$

According to this Formula (1), the larger a value of the sightline distance d becomes, the larger a size of the character is calculated. For example, as illustrated in FIG. 6, when a value of the vertical viewing angle θ is the same, the sightline distance d is larger than the sightline distance d', and therefore, the character height h corresponding to the sightline distance d is calculated larger than the character height h' corresponding to the sightline distance d'.

Generally, to a human being's eye, an object located at a position where the sightline distance is larger looks smaller. On the other hand, according to the Formula (1), the larger the sightline distance is, the larger a size of the character displayed on the display surface 30 is calculated. Therefore, according to the Formula (1), even when a size of the sightline distance d changes due to the user 2 shifting a sightline direction etc., for example, a character displayed on the display surface 30 is recognized for the user 2 to have almost the same size.

Note that, the character size calculating unit 108 can calculate a size of the character using a fixed value as a value of the vertical viewing angle θ. For example, a vertical viewing angle value which is perceived by many users 2 that characters are the easiest to be read in a user test performed in advance for two or more users 2 may be set as a value of the vertical viewing angle θ.

Alternatively, the character size calculating unit 108 can also dynamically change a value of the vertical viewing angle θ in accordance with prescribed conditions such as brightness of a room, a type of a font, a language, a background image of a character, or an age of the user 2, for example. For example, the darker the room is, the larger the character size calculating unit 108 sets a value of the vertical viewing angle θ. In addition, the lower a luminance of a background image of a character is, the larger the character size calculating unit 108 sets a value of the vertical viewing angle θ. According to these setting examples, a character size is calculated larger in a situation where a character is not read as easily as usual, and therefore, the character readability is enhanced.

A. Modification Example 1

In addition, the character size calculating unit 108, also with respect to a case where the menu image 40 does not include a character, can calculate a temporary character size by the above-mentioned Formula (1).

B. Modification Example 2

In addition, the character size calculating unit 108 can also calculate the optimum size of a picture included in the menu image 40 in accordance with the sightline distance calculated by the sightline distance calculating unit 106. Note that, a value of the vertical viewing angle θ in the Formula (1), for example, as in the case of a character, can be set to a vertical viewing angle value which is perceived by many users 2 that the picture is the easiest to be seen in a user test performed in advance for two or more users 2.

C. Modification Example 3

Note that, according to the above-mentioned Formula (1), the smaller the sightline distance d becomes, the smaller a size of the character is calculated, and therefore, when the sightline distance d becomes very small, the character will be displayed in a collapsed way, and may become difficult to be read by the user 2. Therefore, as a modification example 3, the character size calculating unit 108, when a character size calculated by the above-mentioned Formula (1) becomes smaller than a prescribed size determined in advance, can also set the prescribed size as a size of the character. Note that, the prescribed size may be set in accordance with a resolution of the display surface 30, a type of a font, or a type of the output device 162, etc., for example.

2-1-6. Display Control Unit 110

A. Determination of Size of Menu Image 40

The display control unit 110 determines a size of the menu image 40 in accordance with a sightline distance calculated by the sightline distance calculating unit 106. More specifically, the larger the sightline distance calculated by the sightline distance calculating unit 106 is, the larger the display control unit 110 can determine the size of the menu image 40.

FIG. 7 is an explanatory view illustrating each size of the menu image 40 determined by the display control unit 110 in a case where the sightline distance is different. As illustrated in FIG. 7, for example, the display control unit 110, when the sightline distance d calculated by the sightline distance calculating unit 106 is larger than the sightline distance d', determines a size of the menu image 40a corresponding to the sightline distance d so as to be larger than a size of the menu image 40b corresponding to the sightline distance d'.

When the above-mentioned function will be described further in detail, the display control unit 110 determines a size of the menu image 40 in accordance with a size of the character calculated by the character size calculating unit 108. For example, the larger a size of the character calculated by the character size calculating unit 108 is, the larger the display control unit 110 determines a value of the size of the menu image 40.

As mentioned above, to a human being's eye, an object located at a position where the sightline distance is larger looks smaller. On the other hand, according to the above-mentioned determination example, the larger the sightline distance is, the larger the menu image 40 is displayed on the display surface 30. Therefore, according to the above-mentioned determination example, even when a size of the sightline distance changes due to the user 2 shifting a sightline direction etc., for example, the menu image 40 displayed on the display surface 30 is recognized for the user 2 to have almost the same size. Therefore, the visibility of the menu image 40 is maintained.

Note that, with respect to the above-mentioned background image displayed on the display surface 30, unlike the menu image 40, it is possible for the display control unit 110 not to change a size of the background image even when the sightline distance changes.

Modification Example 1

Note that, when the menu image 40 includes characters of a plurality of sizes, the display control unit 110 can determine the size of the menu image 40 in accordance with a size calculated by the character size calculating unit 108 with respect to the smallest character included in the menu image 40. Alternatively, the display control unit 110 can determine the size of the menu image 40 in accordance with a size calculated by the character size calculating unit 108 with respect to a character having higher possibility of attention paid by the user 2 in the menu image 40. Here, an example of a character having high possibility of attention paid by the user 2 includes a television program name in a case where the menu image 40 is a television program table, or a character string which denotes a link destination in a case where the menu image 40 is a web page, etc.

Modification Example 2

In addition, with respect to a case where the menu image 40 does not include a character, the display control unit 110 can determine a size of the menu image 40 by any of two kinds of methods in the following. In the first, the display control unit 110 can determine the size of the menu image 40 in accordance with a (temporary) character size calculated by the character size calculating unit 108 using e.g. the Formula (1). In the second, the display control unit 110 can determine the size of the menu image 40 in accordance with the optimum size of a picture, which is calculated by the character size calculating unit 108.

Modification Example 3

Note that, according to the above-mentioned determination example, the larger the sightline distance d is, the larger a size of the menu image 40 is calculated, and therefore, there is a possibility that if the sightline distance d becomes very large, a part of the menu images 40 may protrude from the display surface 30. Therefore, as a modification example 3, the display control unit 110, when the size of the menu image 40, which is calculated in accordance with the sightline distance d, becomes larger than a prescribed size, can determine the prescribed size as the size of the menu image 40. Note that the prescribed size may be set in accordance with the size of the display surface 30, for example.

B. Determination of Display Position of Menu Image 40

(B-1. Display on Viewing Position)

Figure 8:
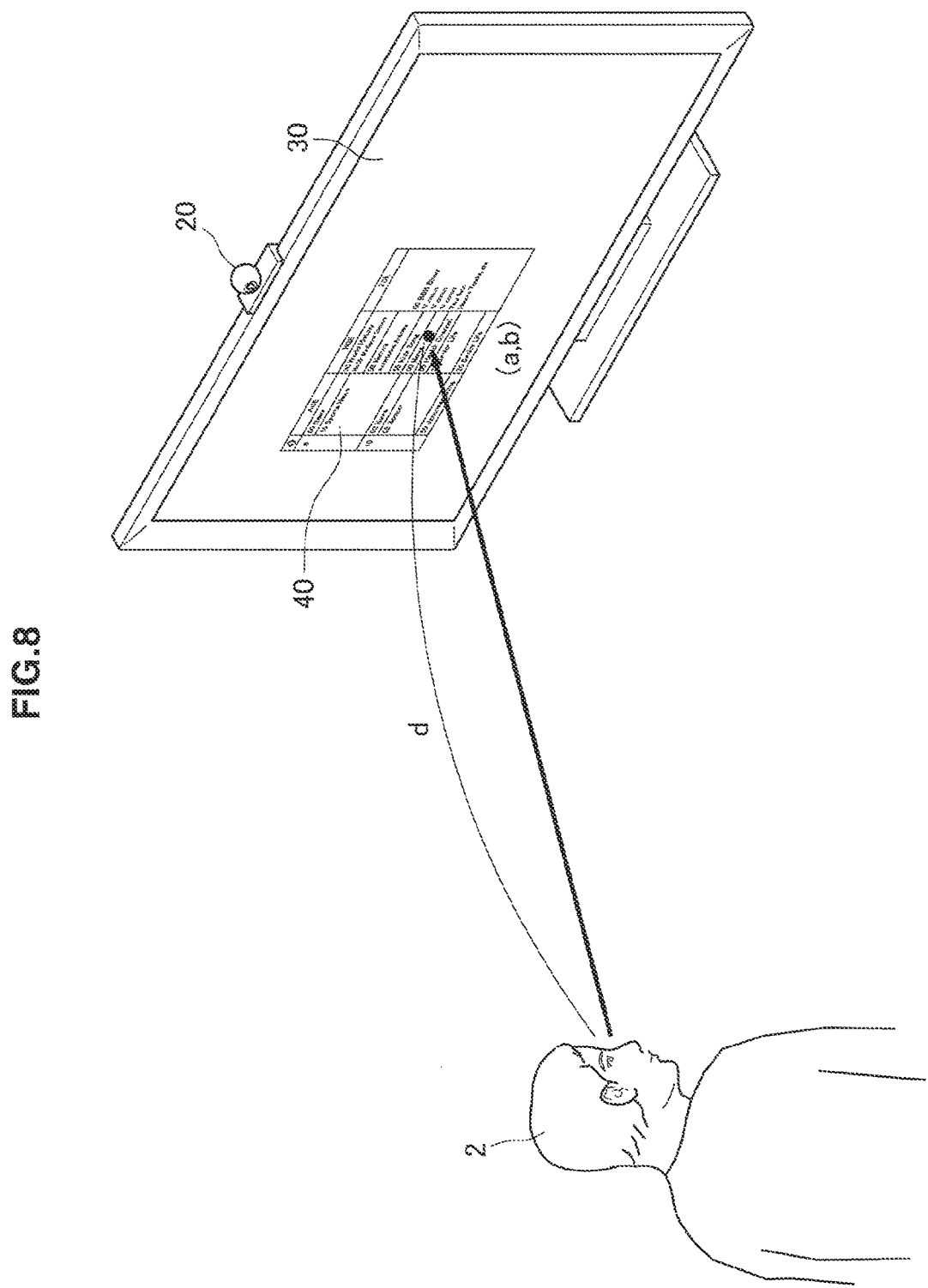
FIG. 8 is an explanatory view illustrating a display example of the menu image 40 according to the embodiment.

In addition, the display control unit 110 makes the menu image 40 be displayed on the display surface 30 in a determined size. More specifically, the display control unit 110 can make the menu image 40 be displayed at the viewing position calculated by the viewing position calculating unit 104 on the display surface 30. For example, as illustrated in FIG. 8, the display control unit 110 makes the menu image 40 be displayed so that the viewing position may be included in a viewing area of the menu image 40 such that a center position of the menu image 40 may be set to the viewing position.

According to this display example, the menu image 40 is displayed at the position which the user 2 currently views on the display surface 30. Therefore, the user 2 can view the menu image 40 comfortably without the necessity of moving the sightline at the time when the menu image 40 is displayed.

(B-2. Application of Filter)

Incidentally, due to e.g. blinking of eyes or swinging of a posture, the sightline direction of the user 2 changes largely as needed, generally, and therefore, the viewing position calculated by the viewing position calculating unit 104 tends to vibrate largely as needed. Therefore, for example, the possibility is large that the viewing position calculated by the viewing position calculating unit 104 in a case where an operation of displaying the menu image 40 has been performed by the user 2 may differ from the position which the user 2 currently views when the menu image 40 is actually displayed.

Then, as a modification example, the display control unit 110, first, can calculate a display position of the menu image 40 by applying a prescribed filter to two or more viewing positions calculated by the viewing position calculating unit 104 in a prescribed time period from the time when an operation of displaying the menu image 40 has been performed. Then, the display control unit 110 can make the menu image 40 be displayed at the calculated display position. Note that, as an example of the prescribed filter, a low pass filter or the like is given.

—Adjustment of Coefficient of Filter—

Figure 9:
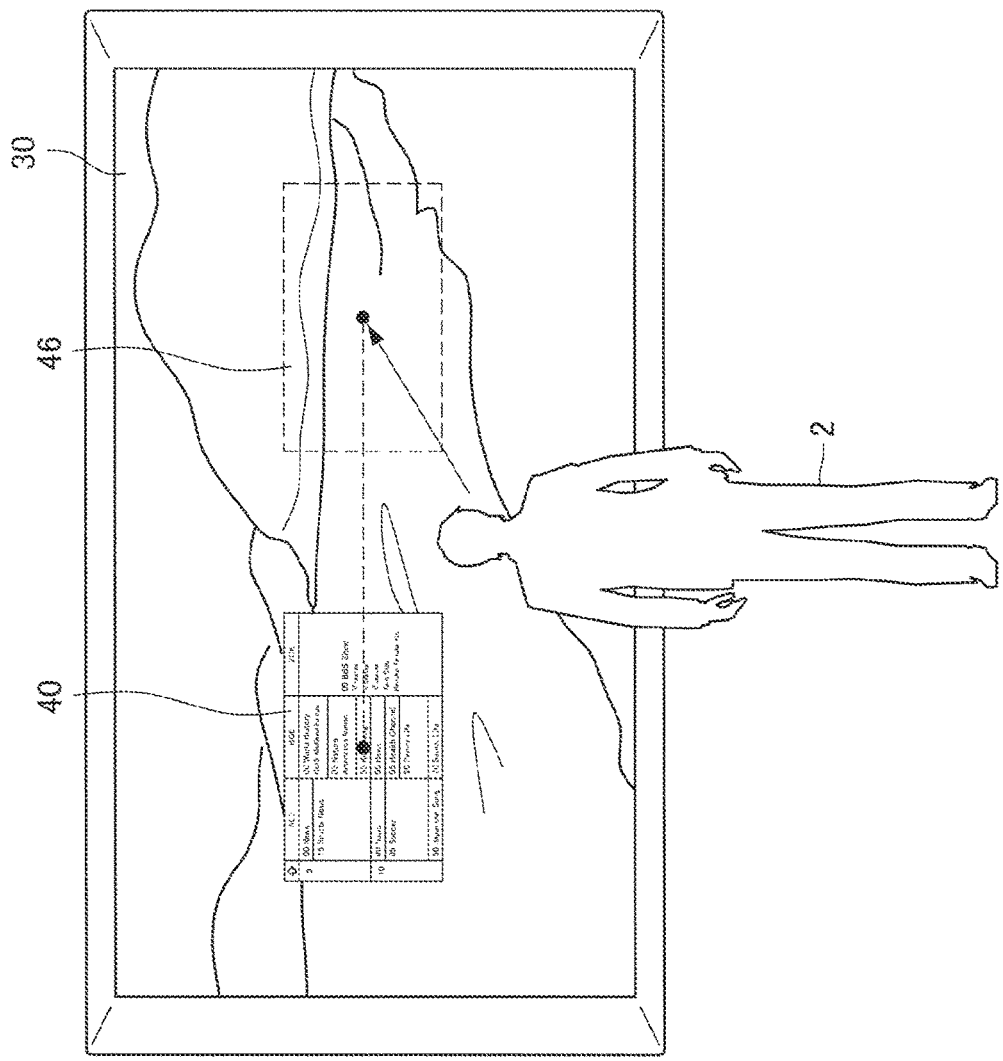
FIG. 9 is an explanatory view for describing an example where a display position of the menu image 40 and a position which the user 2 views deviate from each other at the time of display start of the menu image 40.

However, when a coefficient of the prescribed filter is powerful, in a case where an operation of displaying the menu image 40 has been performed by the user 2 in a situation where the sightline of the user 2 is moved as illustrated in FIG. 9, for example, it is also assumed that a display position calculated by the display control unit 110 is largely different from a position which the user 2 views on the display surface 30. Note that, FIG. 9 illustrates an example where after an operation of displaying the menu image 40 has been performed until the menu image 40 is displayed, the viewing position of the user 2 has been moved up to the inside of a region 46 illustrated with a dashed line in FIG. 9, and thereby, a large deviation has arisen between the display position of the menu image 40 and the viewing position of the user 2.

In this way, at the time of display start of the menu image 40, if the menu image 40 is displayed at a position deviated from the position which the user 2 actually views, the user 2 may have a possibility of holding a sense of discomfort to the display position of the menu image 40.

Then, with respect to coefficients of the prescribed filter, even when the menu image 40 is made to be displayed while the user 2 moves the sightline, it is also possible for the coefficients to be set to an appropriate value such that a display position calculated by the display control unit 110 may not be largely different from a position which the user 2 views at the time of display start of the menu image 40, for example. According to this setting example, the possibility that the user 2 holds a sense of discomfort to the display position of the menu image 40 can be decreased.

(B-3. Display on Fixed Position)

Figure 10:
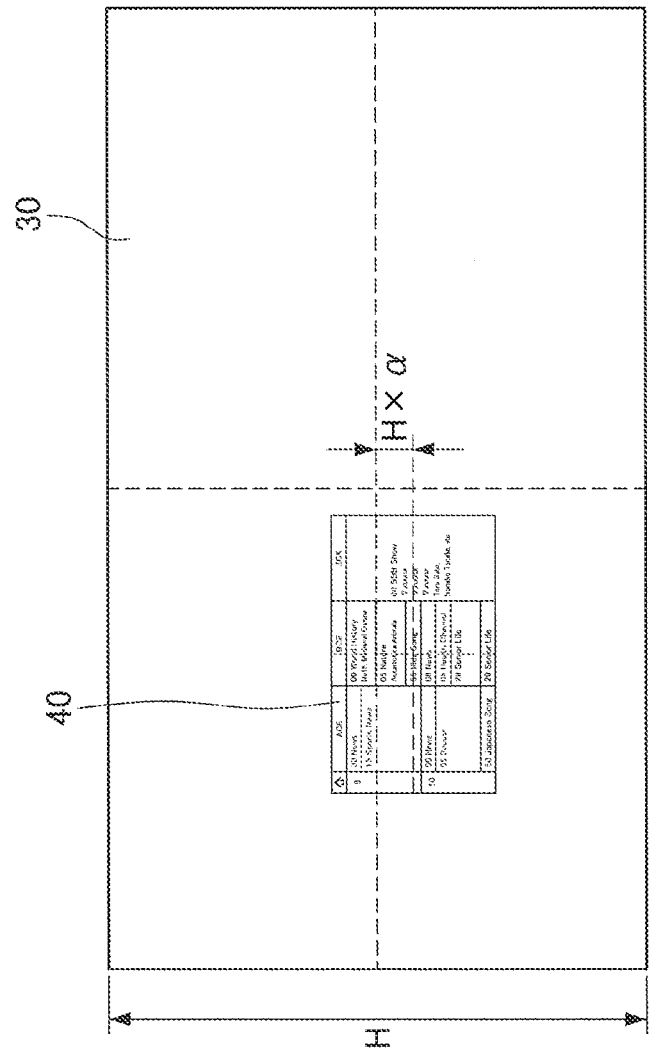
FIG. 10 is an explanatory view illustrating an example of the display position of the menu image 40 according to the embodiment.

In addition, as another modification example, the display control unit 110 can also make the menu image 40 be displayed at a prescribed position on the display surface 30. For example, as illustrated in FIG. 10, the display control unit 110 may make the menu image 40 be displayed at a position of a point which has, with respect to a vertical direction, a prescribed coordinate value such as a coordinate value which is made lower than the center in the vertical direction of the display surface 30 by a value obtained by multiplying a length H in a vertical direction of the display surface 30 by a prescribed coefficient α, for example, and with respect to a horizontal direction, the same coordinate value as the viewing position, for example.

As an effect by this modification example, since the display is not performed in accordance with the viewing position of a specific user 2 in a situation where two or more users 2 view the display surface 30 together, for example, a point that the menu image 40 can be displayed so as to be viewed easily for two or more users 2 is given.

C. Display of Report Information 42

In addition, as a modification example, the display control unit 110 further can make report information 42 to be reported to the user be displayed on the display surface 30. Moreover, the display control unit 110 can also move the display position of the report information 42 in accordance with a change of the viewing position of the user 2. Here, the report information 42 may be a message for reporting an abnormality, etc. of the information processing device 10, or earthquake information, and an emergency alert message, etc., for example. Alternatively, the report information 42 may be an image having various forms like the menu image 40.

Figure 11:
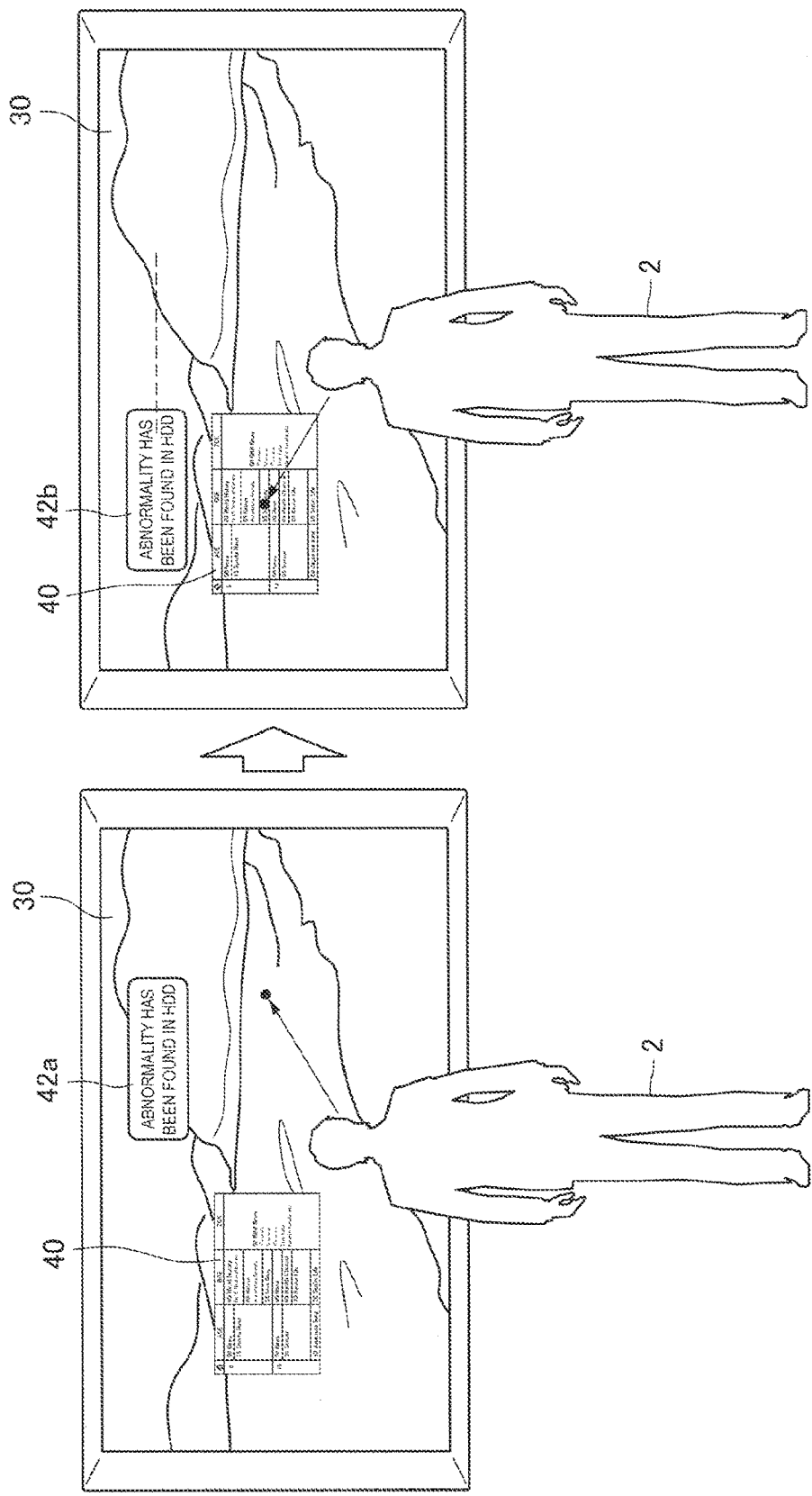
FIG. 11 is an explanatory view illustrating a control example of the display position of report information 42 according to the embodiment.

Here, with reference to FIG. 11, the above-mentioned function will be described in more detail. FIG. 11 is an explanatory view illustrating a change example of a display position of the report information 42 in a case where the user 2 changes the sightline direction. Note that, FIG. 11 illustrates, as the report information 42, an example where a message "abnormality has been found in HDD" is displayed.

For example, as illustrated in FIG. 11, when the user 2 changes the sightline direction so as to be changed from the viewing position illustrated in the figure on the left-hand side of FIG. 11 to the viewing position illustrated in the figure on the right-hand side, the display control unit 110 changes the display position of the report information 42 horizontally like from report information 42*a* to report information 42*b*. Alternatively, the display control unit 110 changes the display position of the report information 42 in a vertical direction in accordance with a change of the viewing position of the user 2.

Alternatively, the display control unit 110 makes the report information 42 be displayed at the viewing position of the user 2, and then, moves the display position of the report information 42 following the change of the viewing position. Alternatively, the display control unit 110 makes the report information 42 be displayed at a position apart from the viewing position of the user 2 by a prescribed distance with respect to a horizontal direction or a vertical direction, for example, and then, moves the display position of the report information 42 with a prescribed distance separated from the viewing position in accordance with a change of the viewing position.

Note that, as illustrated in FIG. 11, the display control unit 110 makes the report information 42 be displayed in front of the background image, i.e. be superimposedly displayed. In addition, the display control unit 110, when a display area of the report information 42 is overlapped with a display area of the menu image 40, can make the report information 42 be displayed in front of the menu image 40.

According to these display examples, the display position of the report information 42 changes in accordance with the change of the sightline direction of the user 2, and therefore, the user 2 can be made to notice the report information 42 surely and promptly. For example, information which has high urgency and information which has high importance can be reported to the user 2 promptly.

D. Display of Pop-Up Image 44

In addition, as a modification example, the display control unit 110 can also make a pop-up image 44 be displayed on the display surface 30 in addition to the menu image 40. This pop-up image 44 is an image for displaying auxiliary contents with respect to the menu image 40 such as a context menu with respect to an item selected by the user 2 in the menu image 40, for example.

Figure 12:
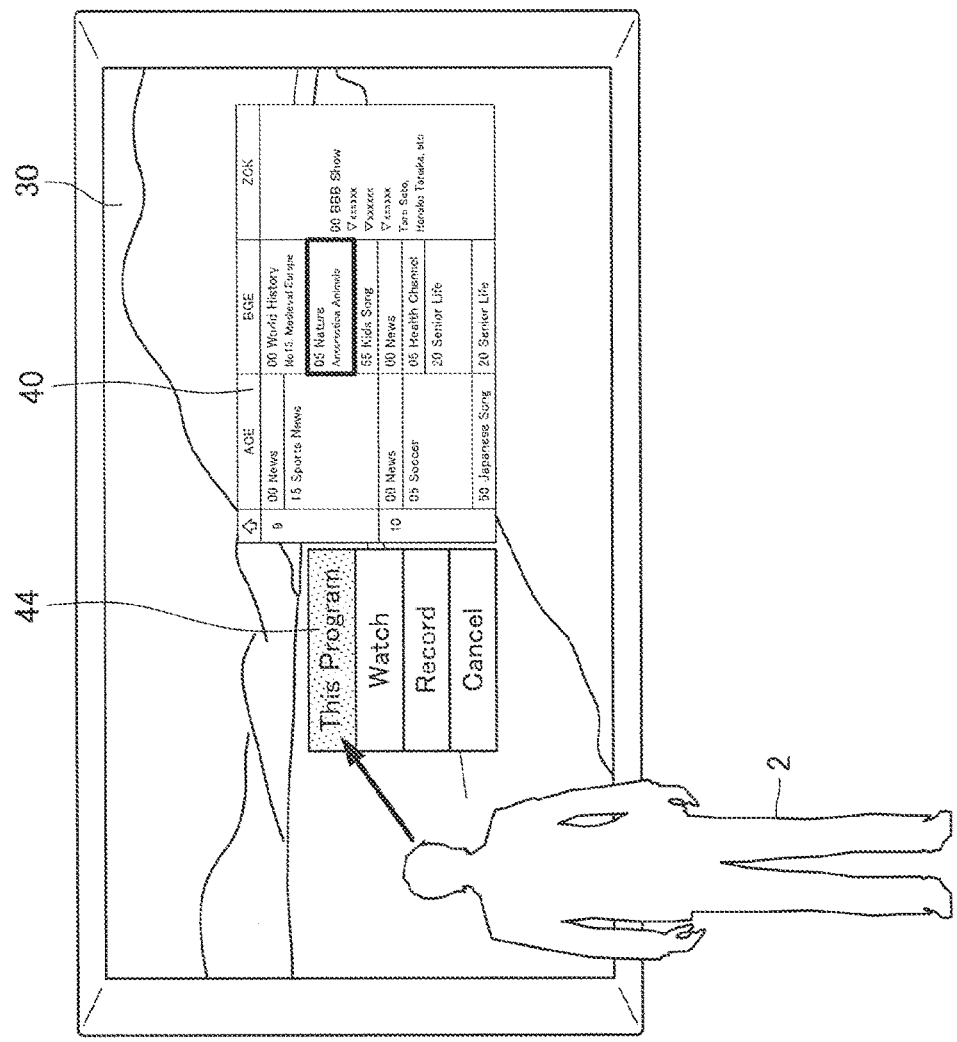
FIG. 12 is an explanatory view illustrating a display example of a pop-up window 44 according to the embodiment.

Here, with reference to FIG. 12, the above-mentioned function will be described in more detail. FIG. 12 is an explanatory view illustrating an example where the pop-up image 44 for selection of browsing or recording of the selected program is displayed in a case where a program of "Nature" has been selected by the user 2 in the menu image 40. As illustrated in FIG. 12, the display control unit 110, when an operation for displaying the pop-up image 44 is performed by the user 2, makes the pop-up image 44 be displayed at the viewing position or near the viewing position of the user 2 at the time of the operation, for example.

Note that, the display control unit 110 may make the pop-up image 44 be displayed at a prescribed position determined in advance, for example, which is not related to the viewing position.

E. Modification Example of Display of Menu Image 40

Modification Example 1

Figure 13:
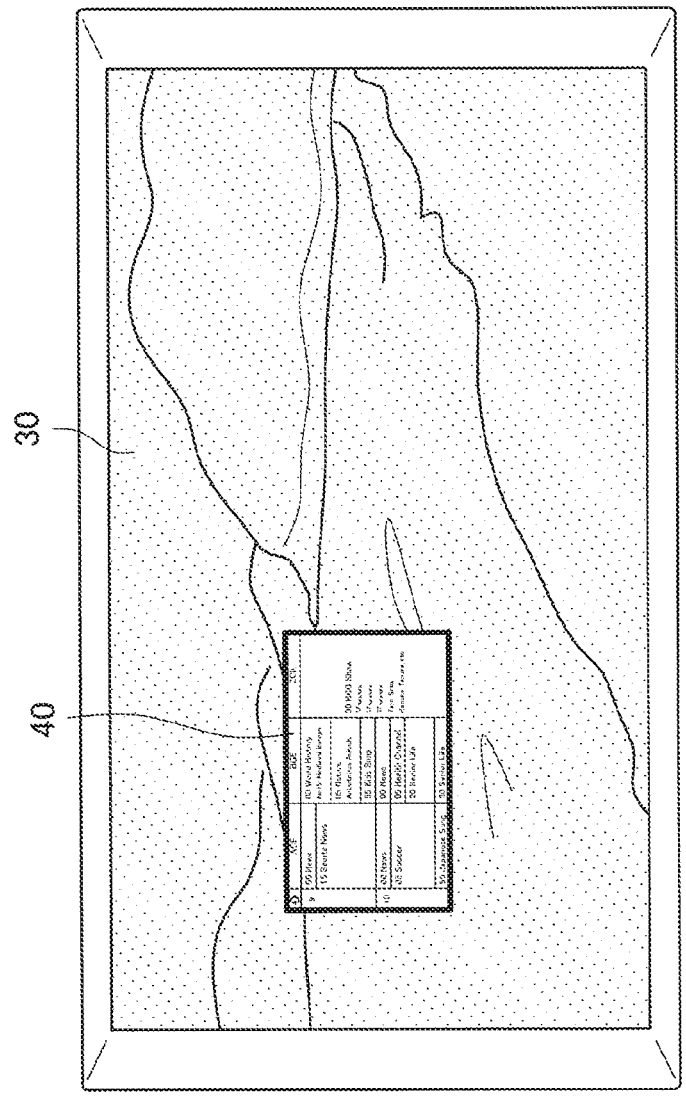
FIG. 13 is an explanatory view illustrating another display example of the menu image 40 according to the embodiment.

In addition, as a modification example, the display control unit 110, as illustrated in FIG. 13, can also make the menu image 40 be displayed with a contour of the menu image 40 enclosed by e.g. a bright-colored illumination. According to this modification example, the contour of the menu image 40 can be recognized more clearly by the user 2, and therefore, the visibility of the menu image 40 is enhanced.

Modification Example 2

In addition, as another modification example, the display control unit 110 can make the background image be displayed on the display surface 30 more darkly as illustrated in FIG. 13 at the time of displaying of the menu image 40. For example, the display control unit 110 makes black half tone dot meshing of about 50% of transmittance superimposed on the whole background image at the time of displaying of the menu image 40. According to this modification example, particularly in a case or the like where the menu image 40 and the background image are images each having a similar gradation, or the background image is a bright image, the menu image 40 can be displayed so as to be more conspicuous than the background image. Therefore, the visibility of the menu image 40 is enhanced.

Note that, the display control unit 110 can also make the above-mentioned modification example 1 and modification example 2 be displayed in a combined manner.

2-1-7. Input Judgment Unit 112

Figure 14:
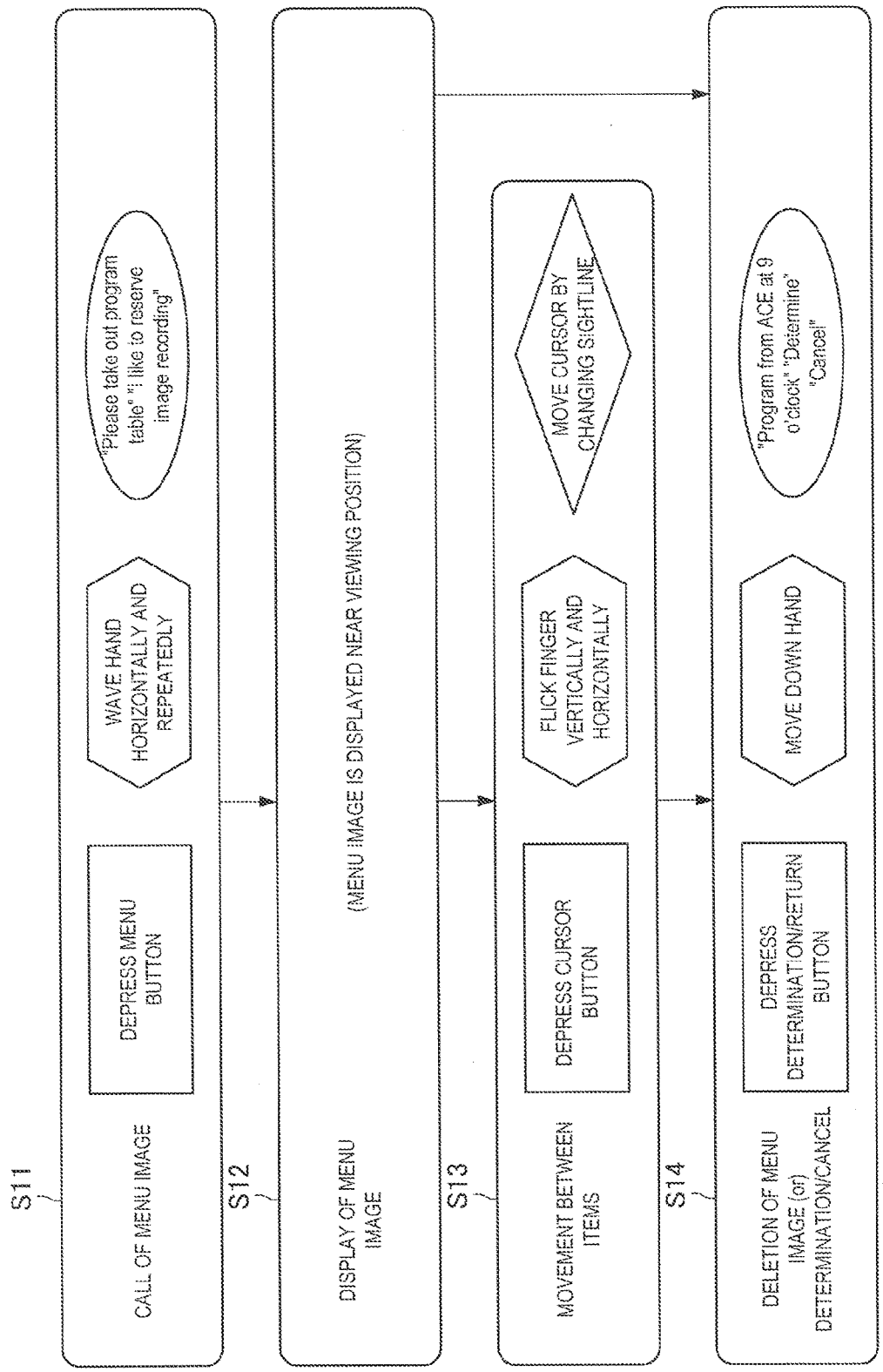
FIG. 14 is an explanatory view illustrating an operation flow of a user 2 with respect to displaying of the menu image 40.

The input judgment unit 112 judges an input content of the user 2 based on input information acquired by the communication unit 120 described later, for example. Here, with reference to FIG. 14, the above-mentioned function will be described in more detail. FIG. 14 is an explanatory view illustrating a flow of operations of the user 2 from a call operation (S11) of the menu image 40 to a selection operation (S14) of the user 2 in the menu image 40. Note that, in FIG. 14, a rectangle denotes an operation of the user 2 using the remote controller, a hexagon denotes an operation by a gesture of the user 2, a diamond shape denotes an operation by the sightline of the user 2, and an ellipse denotes an operation by utterance of the user 2, respectively.

(A. Call of Menu Image 40)

The input judgment unit 112, when the menu image 40 is not displayed, for example, judges an operation of calling the menu image 40 by the user 2 based on input information etc. acquired by the communication unit 120 (S11). As illustrated in FIG. 14, when the input judgment unit 112 recognizes that input information received from the remote controller indicates that a menu button of the remote controller has been depressed, for example, the input judgment unit 112 judges to call the menu image 40. In addition, when the input judgment unit 112 performs image recognition of pictures received at any time from the camera 20, and then, recognizes an operation of waving a hand by the user 2 horizontally and repeatedly, the input judgment unit 112 judges to call the menu image 40. In addition, when the input judgment unit 112 carries out voice recognition of a voice inputted to the input unit 122, and then, recognizes a prescribed voice, the input judgment unit 112 judges to call the menu image 40 corresponding to the recognition result. For example, the input judgment unit 112, when recognizing a voice "take out a program table", judges to call the menu image 40 corresponding to the program table.

Note that, after S11, i.e., when it is judged to call the menu image 40 by the input judgment unit 112, the display control unit 110 makes the menu image 40 be displayed near the viewing position of the user 2 on the display surface 30, for example (S12).

(B. Movement Between Items)

In addition, the input judgment unit 112, after S12, judges an operation, by the user 2, of moving between selection items included in the menu image 40 based on input information acquired by the communication unit 120, for example, (S13). As illustrated in FIG. 14, when the input judgment unit 112 recognizes that the input information received from the remote controller indicates that a cursor button of the remote controller has been depressed, for example, the input judgment unit 112 judges a moving instruction content by the user 2 based on the received input information. In addition, when the input judgment unit 112 performs image recognition of pictures received at any time from the camera 20, and then, recognizes an operation of flicking a finger of a hand vertically and horizontally by the user 2, the input judgment unit 112 judges the moving instruction content by the user 2 based on the recognized operation. In addition, when the input judgment unit 112 performs image recognition of pictures received at any time from the camera 20, and then, recognizes change of the sightline direction of the user 2, the input judgment unit 112 judges the recognized change of the sightline direction as the moving instruction content by the user 2.

(C. Deletion of Menu Image, or Determination/Cancel Operation)

In addition, the input judgment unit 112, after S12 or S13, judges the selection operation by the user 2 in the menu image 40, such as deletion of the menu image 40, for example, based on input information acquired by the communication unit 120, for example, (S14).

For example, as illustrated in FIG. 14, when the input judgment unit 112 recognizes that the input information received from the remote controller indicates that a "determination button" of the remote controller has been depressed, the input judgment unit 112 judges to determine the selection content in S13. In addition, when the input judgment unit 112 recognizes that the input information received from the remote controller indicates that a "return button" of the remote controller has been depressed, the input judgment unit 112 judges to cancel the selection content in S13 and shift the process to the process of S12.

In addition, when the input judgment unit 112 performs image recognition of pictures received at any time from the camera 20, and then, recognizes an operation of moving down a hand by the user 2, the input judgment unit 112 judges to delete the menu image 40.

In addition, when the input judgment unit 112 performs voice recognition of a voice inputted to the input unit 122, and then, recognizes a prescribed voice, the input judgment unit 112 judges to perform processing corresponding to the recognition result. For example, the input judgment unit 112, when recognizing a voice "Program from ACE 9 o'clock", judges to select a program broadcasted from 9 o'clock in a broadcasting station "ACE". In addition, the input judgment unit 112, when recognizing a voice of "determination" or "determining", judges to determine the selection content in S13. In addition, the input judgment unit 112, when recognizing a voice of a "cancel" or "stop", judges to cancel the selection content in S13 and shift the process to the process of S12.

Modification Example

In addition, as a modification example of the operation of S14, the input judgment unit 112 can judge the input content indicated by the input information acquired by the communication unit 120, for example, based on whether the viewing position calculated by the viewing position calculating unit 104 is included in the display area of the menu image 40.

More specifically, the input judgment unit 112, when the viewing position is included in the display area of the menu image 40 at the time of acquisition of the input information, can judge that the input content indicated by the acquired input information is a determination operation. In addition, the input judgment unit 112, when the viewing position is not included in the display area of the menu image 40 at the time of acquisition of the input information, can judge that the input content indicated by the acquired input information is a cancel operation.

Here, with reference to FIG. 15, the above-mentioned function will be described in more detail. For example, as illustrated in a figure on the left-hand side in FIG. 15, the input judgment unit 112, in a case where the input information indicating that a prescribed button has been depressed is received from the remote controller, when the viewing position is included in the display area of the menu image 40, judges that the input content indicated by the received input information is the determination operation. In addition, as illustrated in a figure of the right-hand side in FIG. 15, the input judgment unit 112, in a case where the input information indicating that a prescribed button has been depressed is received from the remote controller, when the viewing position is not included in the display area of the menu image 40, judges that the input content indicated by the received input information is the cancel operation.

2-1-8. Communication Unit 120

The communication unit 120 is an example of an acquisition unit in the present disclosure. The communication unit 120 transmits/receives information to/from various kinds of devices capable of communicating with the information processing device 10 by wired communication or wireless communication. For example, the communication unit 120 receives the image photographed by the camera 20 from the camera 20. In addition, the communication unit 120 receives the input information indicating that a button has been depressed from the remote controller.

2-1-9. Input Unit 122

The input unit 122 is an example of the acquisition unit in the present disclosure. The input unit 122 accepts various kinds of input operation by the user 2 to the information processing device 10. For example, the input unit 122 accepts the utterance by the user 2.

2-1-10. Display Unit 124

The display unit 124 displays the menu image 40 and the report information 42, etc. for example, on the display surface 30 based on control by the display control unit 110.

Note that, according to an embodiment of the present disclosure, there can be also provided a computer program for making hardware such as the CPU 150, the ROM 152, and the RAM 154 which are built-in in the information processing device 10 exhibit functions equivalent to each of configurations of the information processing device 10 mentioned above. In addition, a recording medium where the computer program has been recorded is also provided.

In addition, configurations according to an embodiment of the present disclosure are not limited to the configurations mentioned above. For example, any one or more of the communication unit 120, the input unit 122, and the display units 124 may not be included in the information processing device 10, and may be included in the other devices.

2-2. Operation

Figure 16:
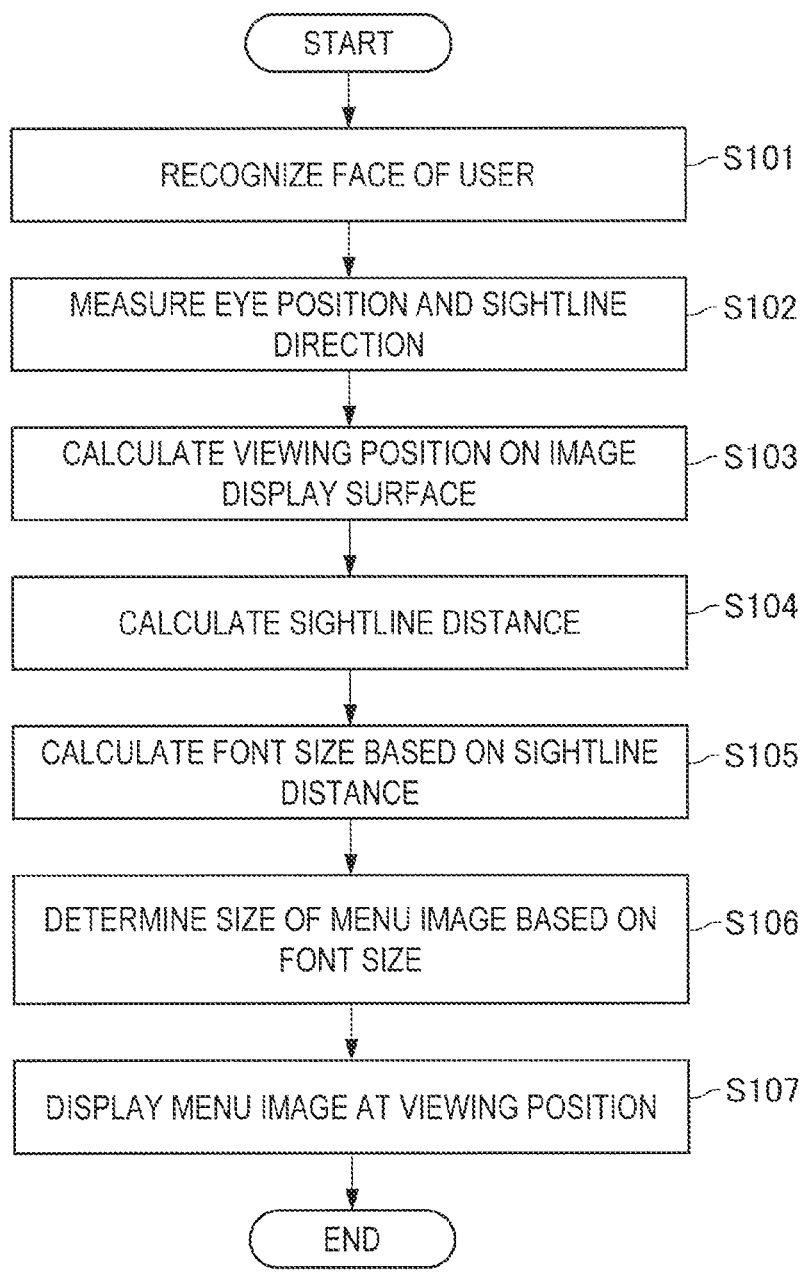
FIG. 16 is a flow chart illustrating operations according to the embodiment.

As mentioned above, configurations according to the present embodiment have been described. Subsequently, operations according to the present embodiment will be described. FIG. 16 is a flow chart illustrating the operations according to the present embodiment.

As illustrated in FIG. 16, first, the sightline specifying unit 102, by extracting feature points with respect to a human face from the photographed image by the camera 20, for example, detects a face of the user 2 (S101). Subsequently, the sightline specifying unit 102 detects eyes of the user 2, based on the face image of the user 2 detected in S101. Then, the sightline specifying unit 102 specifies the sightline direction of the user 2, based on the image of the detected eyes of the user 2 (S102).

Subsequently, the viewing position calculating unit 104 calculates the viewing position of the user 2 in the display surface 30, based on the eye position of the user 2 specified in S102 and the sightline direction of the user 2 (S103).

Subsequently, the sightline distance calculating unit 106 calculates the sightline distance between the eye position of the user 2 specified by S102 and the viewing position calculated in S103 (S104).

Subsequently, the character size calculating unit 108 calculates a size of the character included in the menu image 40 by e.g. the Formula (1) based on the sightline distance calculated in S104 (S105).

Subsequently, the display control unit 110 determines the size of the menu image 40 in accordance with the character size calculated in S105 (S106).

Thereafter, the display control unit 110 makes the menu image 40 be displayed in the size determined in S106, in the viewing position calculated in S103, (S107).

2-3. Effect

As mentioned above, as described with reference to e.g. FIGS. 3 to 8 and FIG. 16, the information processing device 10 according to the present embodiment calculates the sightline distance between the position of the user 2 and the position of the specific point on the display surface 30 based on the sightline direction of the user 2, and then, determines the size of the menu image 40 displayed on the display surface 30 in accordance with the calculated sightline distance. Therefore, the information processing device 10 determines the size of the menu image 40 in accordance with the size of the sightline distance, and therefore, can secure the visibility of the menu image 40 displayed on the display surface 30.

For example, when the user 2 views the display surface 30 from an oblique direction, the sightline distance becomes large compared with a case where the user 2 views the display surface 30 from the front, and therefore, the information processing device 10 makes the menu image 40 be displayed larger on the display surface 30. Therefore, even when the user 2 changes the direction of the sightline, the size of menu image 40 displayed on the display surface 30 is perceived comparably to the user 2, and the visibility is maintained.

In addition, the information processing device 10 can make the menu image 40 be displayed at the viewing position of the user 2 on the display surface 30. Therefore, the user 2 can view the menu image 40 comfortably without the necessity of moving the sightline at the time when the menu image 40 is displayed.

3. Modification Example

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

3-1. Modification Example 1

Figure 17:
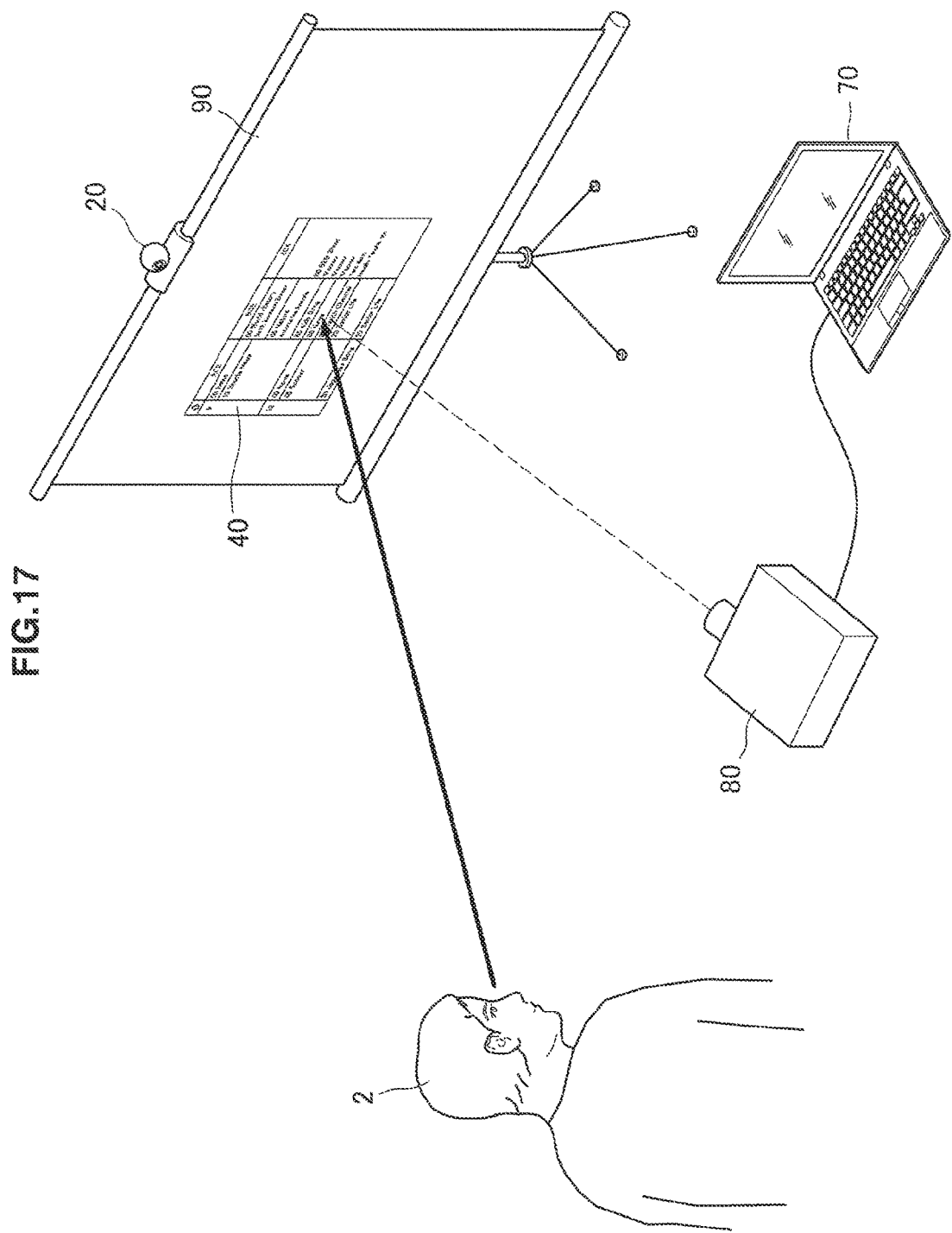
FIG. 17 is an explanatory view illustrating a configuration example of an information processing system according to a modification example of the present disclosure.

For example, the information processing system according to the present disclosure is not limited to the configurations described in Section 1. For example, the information processing system according to the present disclosure can also be designed as a configuration illustrated in FIG. 17. As illustrated in FIG. 17, an information processing system according to this modification example 1 includes an information processing terminal 70, a projection device 80, a projection plane 90, and the camera 20. Note that the camera 20 is the same as the camera 20 according to the present embodiment.

3-1-1. Information Processing Terminal 70

The information processing terminal 70 is another example of the information processing device in the present disclosure. The information processing terminal 70 is a device which makes the projection device 80 project images such as the menu image 40 on the projection plane 90 by an operation of the user 2, for example. This information processing terminal 70 can include all of constituent elements of the information processing device 10 illustrated in FIG. 3. In addition, a function of each of the constituent elements is almost the same as a function described in Section 2-1. Note that, in FIG. 17, the information processing terminal 70 is illustrated as a laptop type personal computer (PC) as an example, but is not limited to such an example. For example, the information processing terminal 70 may be a desktop type PC, a mobile phone such as a smart phone, a tablet terminal, a personal digital assistant (PDA), a digital camera, a glasses type computer, or a game machine, etc.

3-1-2. Projection Device 80

The projection device 80 is a device which projects an image by emission of light. This projection device 80 includes a receiving unit that receives image data from the information processing terminal 70, and a projection unit that projects an image formed in accordance with the received image data by the emission of light. Note that as a modification example, the projection device 80 and the information processing terminal 70 may be constituted integrally.

3-1-3. Projection Plane 90

The projection plane 90 is another example of the image display surface in the present disclosure. The projection plane 90 is a plane which reflects an image projected by the projection device 80. This projection plane 90 may be various kinds of screen such as a matt screen, a wall of a building, or a ceiling in a building, etc., for example.

According to this modification example 1, the information processing terminal 70 calculates the sightline distance between the position of the user 2 and the position of the specific point on the projection plane 90 based on the sightline direction of the user 2, and then, determines the size of the menu image 40 projected on the projection plane 90 in accordance with the calculated sightline distance. Therefore, the information processing terminal 70 determines the size of the menu image 40 in accordance with the size of the sightline distance, and therefore, can secure the visibility of the menu image 40 projected on the projection plane 90. For example, even when the user 2 changes the direction of the sightline, the size of menu image 40 projected on the projection plane 90 is perceived comparably to the user 2, and the visibility is maintained.

In addition, according to the modification example 1, an inexpensive product as is commercially available can be used for the projection device 80 and the projection plane 90, for example, and a large-sized display like the information processing device 10 according to the present embodiment is unnecessary. Therefore, the information processing system according to the modification example 1 can be constituted inexpensively compared with the information processing system according to the present embodiment.

3-2. Modification Example 2

In addition, in the above-mentioned descriptions, although an example where each of constituent elements included in the control unit 100 such as the sightline distance calculating unit 106 and the display control unit 110, for example, according to the embodiment of the present disclosure is included in the information processing device 10 has been described, the present disclosure is not limited to such an example. Each of constituent elements included in the control unit 100 mentioned above, instead of being included in the information processing device 10, may be included in a communication device capable of communicating with the information processing device 10, such as a server device, for example. In addition, a computer program to exhibit the function equivalent to constituent elements included in the control unit 100 mentioned above may be stored in the above-mentioned communication device instead of being stored in the information processing device 10.

Additionally, the present technology may also be configured as below.

(1)

An information processing device including:

a sightline distance calculating unit configured to calculate a sightline distance between a position of a user and a position of a point specified on an image display surface based on a sightline direction of the user; and a display control unit configured to determine a size of a display image displayed on the image display surface in accordance with the sightline distance calculated by the sightline distance calculating unit.

(2)

The information processing device according to (1), further including:

a viewing position calculating unit configured to calculate a viewing position of the user on the image display surface as the position of the point specified on the image display surface based on the position of the user and the sightline direction of the user.

(3)

The information processing device according to (2), wherein the display control unit makes the display image be displayed at the viewing position calculated by the viewing position calculating unit.

(4)

The information processing device according to (2) or (3), further including:

a character size calculating unit configured to calculate a size of a character included in the display image in accordance with the sightline distance, wherein the display control unit determines a size of the display image in accordance with the size of the character calculated by the character size calculating unit.

(5)

The information processing device according to (4), wherein the larger the size of the character calculated by the character size calculating unit is, the larger value the display control unit determines as the size of the display image.

(6)

The information processing device according to (4) or (5), wherein the larger the sightline distance is, the larger the character size calculating unit calculates the size of a character included in the display image.

(7)

The information processing device according to any one of (2) to (6), further including:

a sightline specifying unit configured to specify the position of the user and the sightline direction of the user, wherein the viewing position calculating unit calculates the viewing position on the image display surface based on a specific result by the sightline specifying unit.

(8)

The information processing device according to any one of (2) to (7), wherein the display control unit further makes report information to be reported to the user be displayed on the image display surface, and wherein the display control unit moves a display position of the report information in accordance with change of the viewing position.

(9)

The information processing device according to any one of (2) to (8), further including:

an acquisition unit configured to acquire input information by the user; and an input judgment unit configured to judge an input content indicated by the input information acquired by the acquisition unit based on whether the viewing position calculated by the viewing position calculating unit is included in a display area of the display image on the image display surface.

(10)

The information processing device according to (9), wherein the input judgment unit judges that the input content indicated by the input information is a determination operation when the viewing position is included in the display area of the display image at the time of acquisition of the input information, and wherein the input judgment unit judges that the input content indicated by the input information is a cancel operation when the viewing position is not included in the display area of the display image at the time of acquisition of the input information.

(11)

An information processing method including:

calculating a sightline distance between a position of a user and a position of a point specified on an image display surface based on a sightline direction of the user; and determining, by a processor, a size of a display image displayed on the image display surface in accordance with the calculated sightline distance.

(12)

A program for causing a computer to function as:

a sightline distance calculating unit configured to calculate a sightline distance between a position of a user and a position of a point specified on an image display surface based on a sightline direction of the user; and a display control unit configured to determine a size of a display image displayed on the image display surface in accordance with the sightline distance calculated by the sightline distance calculating unit.

REFERENCE SIGNS LIST 2 user
10 information processing device
20 camera
70 information processing terminal
80 projection device
90 projection plane
100 control unit
102 sightline specifying unit
104 viewing position calculating unit
106 sightline distance calculating unit
108 character size calculating unit
110 display control unit
112 input judgment unit
120 communication unit
122 input unit
124 display unit
150 CPU
152 ROM
154 RAM
156 internal bus
158 interface
160 input device
162 output device
164 storage device
166 communication device

The invention claimed is:

1. An information processing device, comprising:
a central processing unit (CPU) configured to:
control an image display surface to display a display image;
determine a user sightline direction based on a user image;
calculate a user viewing position on the image display surface based on the determined user sightline direction;
calculate a sightline distance between a user eye position in front of the image display surface and the user viewing position on the image display surface, based on the determined user sightline direction;
calculate a size of a character included in the display image based on a user viewing angle and the calculated sightline distance;
set the size of the character as a first size based on the calculated size of the character that is smaller than the first size; and
determine a size of the display image displayed on the image display surface, wherein the size of the display image is determined based on the calculated sightline distance and the calculated size of the character.

2. The information processing device according to claim 1, wherein the CPU is further configured to calculate the user viewing position on the image display surface based on the user eye position.

3. The information processing device according to claim 1, wherein the CPU is further configured to control the image display surface to display the display image at the calculated user viewing position.

4. The information processing device according to claim 1, wherein the determined size of the display image increases with an increase in the calculated size of the character.

5. The information processing device according to claim 1, wherein the calculated size of the character included in the display image increases with an increase in the calculated sightline distance.

6. The information processing device according to claim 1, wherein the CPU is further configured to:
determine the user eye position based on the user image; and
calculate the user viewing position on the image display surface based on the determined user eye position.

7. The information processing device according to claim 1, wherein the CPU is further configured to:
control the image display surface to display report information at a display position on the image display surface; and
change the display position of the report information on the image display surface based on a change of the calculated user viewing position.

8. The information processing device according to claim 1, wherein the CPU is further configured to:
acquire user input information; and
determine an input content indicated by the user input information, wherein the input content is determined based on an inclusion of the user viewing position in a display area of the display image on the image display surface.

9. The information processing device according to claim 8, wherein the CPU is further configured to:

determine the input content indicated by the user input information is a determination operation based on the inclusion of the user viewing position in the display area of the display image at a time of the acquisition of the user input information; and determine the input content indicated by the user input information is a cancel operation based on an exclusion of the user viewing position from the display area of the display image at the time of the acquisition of the user input information.

10. An information processing method, comprising:

controlling an image display surface to display a display image;

determining a user sightline direction based on a user image;

calculating a user viewing position on the image display surface based on the determined user sightline direction;

calculating a sightline distance between a user eye position in front of the image display surface and the user viewing position on the image display surface, based on the determined user sightline direction;

calculating a size of a character included in the display image based on a user viewing angle and the calculated sightline distance;

setting the size of the character as a first size based on the calculated size of the character that is smaller than the first size; and determining a size of the display image displayed on the image display surface, wherein the size of the display image is determined based on the calculated sightline distance and the calculated size of the character.

11. A non-transitory computer-readable medium having stored thereon computer-readable instructions which, when executed by a computer, cause the computer to execute operations, the operations comprising:

controlling an image display surface to display a display image;

determining a user sightline direction based on a user image;

calculating a user viewing position on the image display surface based on the determined user sightline direction;

calculating a sightline distance between a user eye position in front of the image display surface and the user viewing position on the image display surface, based on the determined user sightline direction;

calculating a size of a character included in the display image based on a user viewing angle and the calculated sightline distance;

setting the size of the character as a first size based on the calculated size of the character that is smaller than the first size; and determining a size of the display image displayed on the image display surface, wherein the size of the display image is determined based on the calculated sightline distance and the calculated size of the character.

12. The information processing device according to claim 1, wherein the CPU is further configured to set the first size based on at least one of a resolution of the image display surface, a type of a font, or a type of the image display surface.

13. The information processing device according to claim 1, wherein the CPU is further configured to set the size of the display image as a second size based on the calculated size of the display image that is larger than the second size.

14. The information processing device according to claim 13, wherein the CPU is further configured to set the second size based on a size of the image display surface.

15. The information processing device according to claim 1, wherein the CPU is further configured to dynamically change the user viewing angle based on at least one of a type of a font, a language, a background image of a character, or a user age.

16. The information processing device according to claim 1, wherein the CPU is further configured to:

acquire the user image from an imaging device, wherein the user image comprises a user face directed in an oblique direction with respect to the image display surface;

correct the acquired user image to include the user face directed to the front of the image display surface; and determine the user sightline direction based on the corrected user image.

17. The information processing device according to claim 1, wherein the CPU is further configured to calculate a coordinate of the user viewing position on the image display surface based on the determined user sightline direction and a user head height, wherein the coordinate is in a vertical direction of the image display surface.

18. The information processing device according to claim 1, wherein the CPU is further configured to:

calculate at least two user viewing positions on the image display surface in a threshold time period, wherein the at least two user viewing positions are calculated based on the determined user sightline direction;

apply a filter on the calculated at least two user viewing positions; and calculate a display position of the display image on the image display surface based on the applied filter.

* * * * *